(12) United States Patent
Binder et al.

(10) Patent No.: US 11,462,976 B2
(45) Date of Patent: Oct. 4, 2022

(54) DEVICE AND METHOD FOR SHAPING WIRE ENDS IN A CIRCUMFERENTIAL DIRECTION

(71) Applicant: GROB-WERKE GmbH & Co. KG, Mindelheim (DE)

(72) Inventors: Johannes Binder, Mindelheim (DE); Ralf Rauscher, Fellheim (DE)

(73) Assignee: Grob-Werke GmbH & Co. KG, Mindelheim (DE)

( * ) Notice: Subject to any disclaimer, the term of this patent is extended or adjusted under 35 U.S.C. 154(b) by 3 days.

(21) Appl. No.: 16/971,050

(22) PCT Filed: Feb. 20, 2019

(86) PCT No.: PCT/DE2019/100162
§ 371 (c)(1),
(2) Date: Aug. 19, 2020

(87) PCT Pub. No.: WO2019/161846
PCT Pub. Date: Aug. 29, 2019

(65) Prior Publication Data
US 2020/0395825 A1    Dec. 17, 2020

(30) Foreign Application Priority Data
Feb. 21, 2018   (DE) .......................... 102018103929.8

(51) Int. Cl.
*H02K 15/00*      (2006.01)
*B21F 3/02*       (2006.01)

(52) U.S. Cl.
CPC ........... *H02K 15/0087* (2013.01); *B21F 3/02* (2013.01)

(58) Field of Classification Search
CPC .. H02K 15/0087; H02K 15/0081; B21F 3/02; B21F 3/00
See application file for complete search history.

(56) References Cited

U.S. PATENT DOCUMENTS

| 6,519,993 B2 | 2/2003 | Even |
| 6,543,269 B2 * | 4/2003 | Beuter ...................... B21F 1/00 72/404 |

(Continued)

FOREIGN PATENT DOCUMENTS

| DE | 102018103100 A1 | 1/2019 |
| DE | 102017129474 A1 | 6/2019 |

(Continued)

OTHER PUBLICATIONS

International Search Report; priority document.

*Primary Examiner* — David P Bryant
*Assistant Examiner* — Christine Bersabal
(74) *Attorney, Agent, or Firm* — Greer, Burns & Crain, Ltd.

(57) ABSTRACT

To automate a sub-process during the production of a component, which is to be equipped with coils, of an electric machine, a wire end shaping device is used, which is equipped with coils, of an electric machine, for shaping wire ends which protrude from an annular housing of the component, comprising a bending device for bending wire ends in a circumferential direction, a relative movement device for moving the housing and the bending device in a relative manner in an axial direction, and a controller. The receiving and rotating units, which receive the wire ends, of the bending device are held to be axially static relative to one another, wherein differences in length compensation and/or in a turning angle of the wire ends are handled by means of different movement profiles of the rotational movements of the receiving and rotating units.

8 Claims, 24 Drawing Sheets

(56) References Cited

U.S. PATENT DOCUMENTS

| | | | |
|---|---|---|---|
| 6,862,796 B2 * | 3/2005 | Kato | H02K 15/0037 |
| | | | 29/596 |
| 2003/0132679 A1 | 7/2003 | Kato | |
| 2009/0302705 A1 * | 12/2009 | Guercioni | H02K 15/0056 |
| | | | 310/216.069 |
| 2020/0153319 A1 | 5/2020 | Reiser et al. | |
| 2020/0177065 A1 | 6/2020 | Dreher et al. | |

FOREIGN PATENT DOCUMENTS

| | | |
|---|---|---|
| EP | 1324461 A2 | 7/2003 |
| WO | 2018233769 A1 | 12/2018 |

* cited by examiner

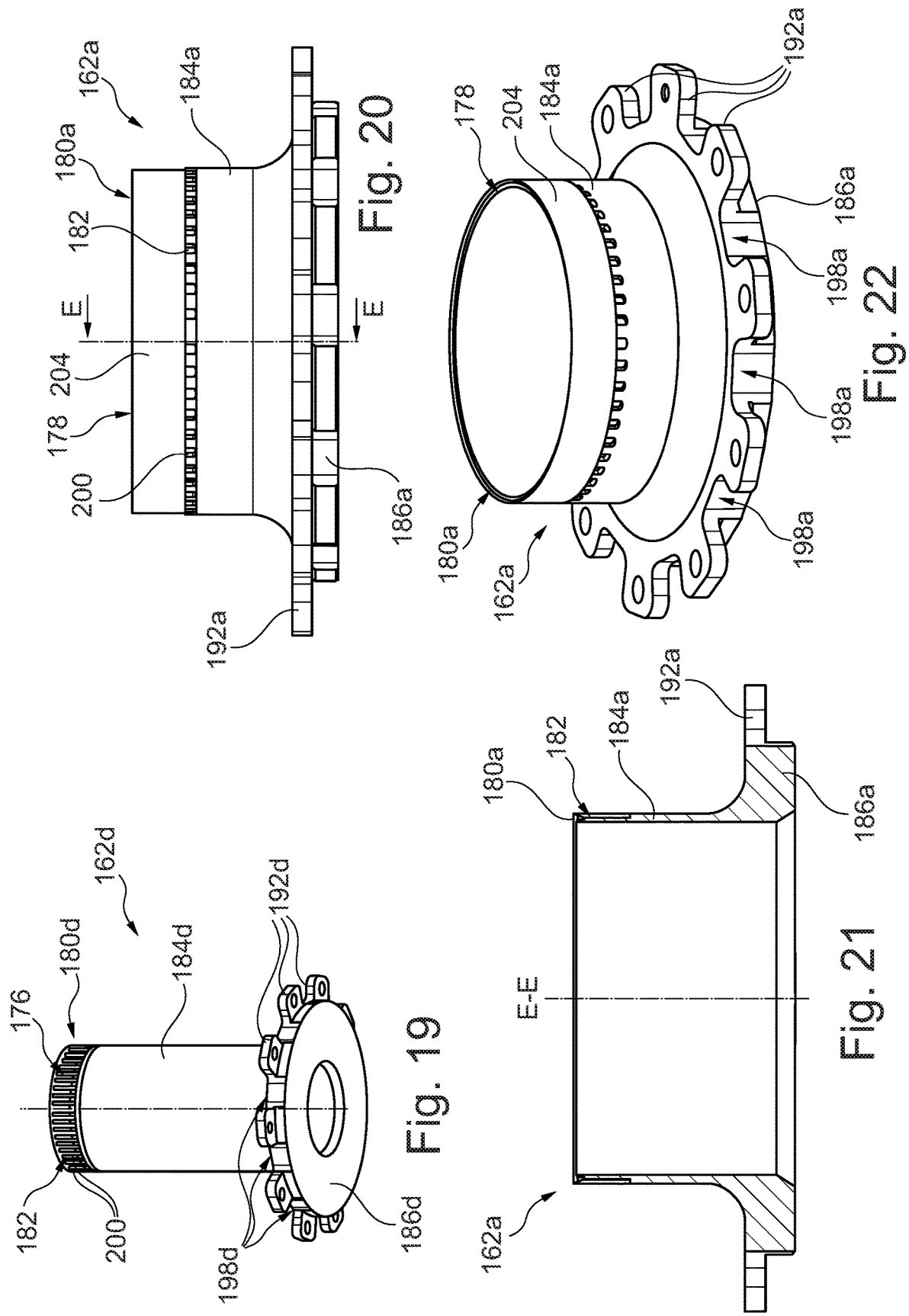

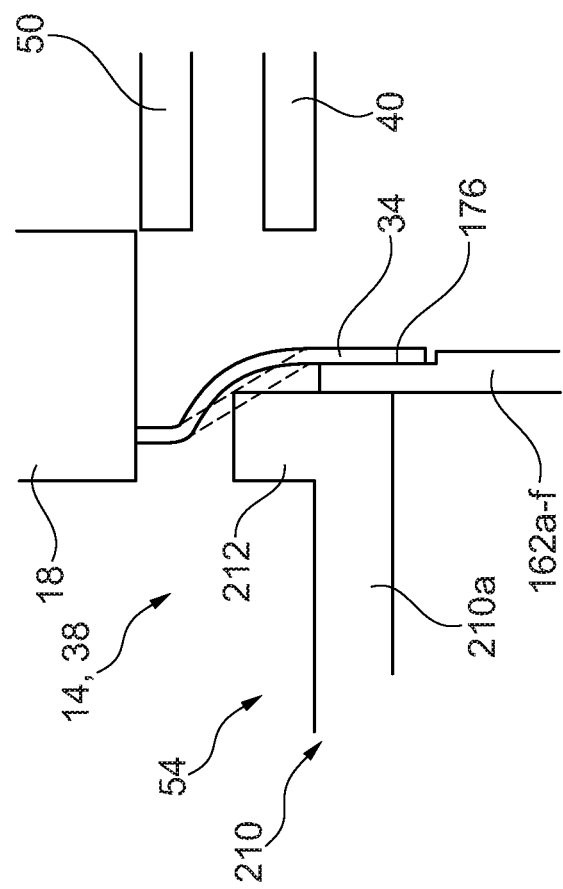
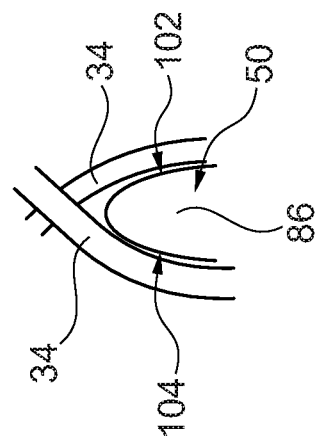
Fig. 34a
Fig. 34b

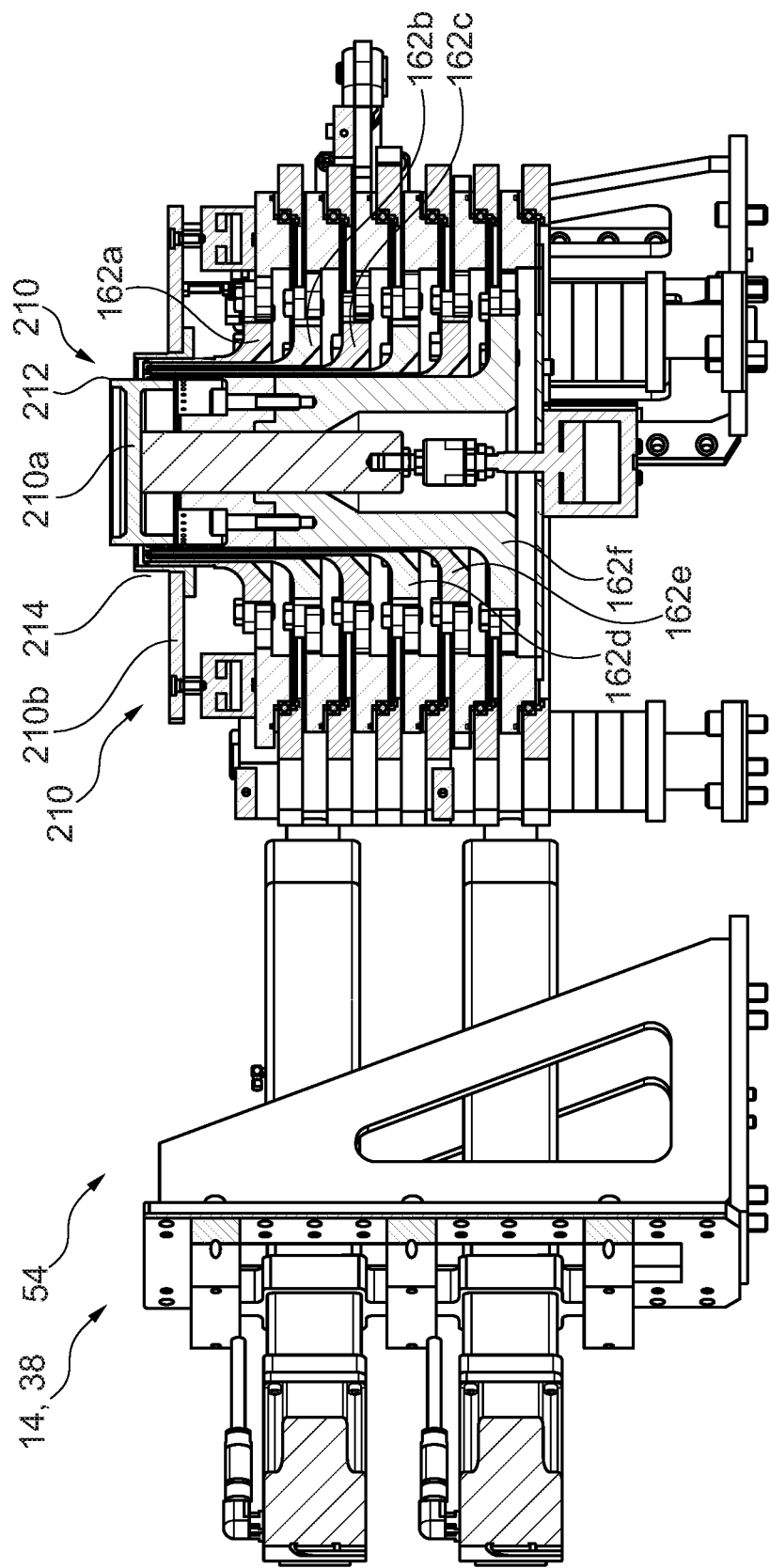

DEVICE AND METHOD FOR SHAPING WIRE ENDS IN A CIRCUMFERENTIAL DIRECTION

CROSS-REFERENCES TO RELATED APPLICATIONS

This application claims the benefit of the International Application No. PCT/DE2019/100162, filed on Feb. 20, 2019, and of the German patent application No. 102018103929.8 filed on Feb. 21, 2019, the entire disclosures of which are incorporated herein by way of reference.

FIELD OF THE INVENTION

The invention relates to a wire end shaping device for use during production of a component, which is equipped with coils, of an electric machine, for shaping wire ends which protrude from an annular housing of the component. The invention furthermore relates to a component production device for producing a component, which is equipped with coils, of an electric machine, comprising a wire end shaping device of said type. Finally, the invention relates to a wire end shaping method, which can be performed preferably using such a wire end shaping device or component production device, for shaping wire ends, which protrude from an annular housing, during the course of production of a component, which is equipped with coils, of an electric machine.

BACKGROUND OF THE INVENTION

Electric machines are to be understood, in particular, to mean machines for converting electrical energy into kinetic energy and machines for converting kinetic energy into electrical energy. In particular, the term is to be understood as encompassing electric motors and generators.

In the production of machine elements of such electric machines, for example stators or rotors, it is often necessary for ends of conductors which are formed from wires to be connected to one another or jointly processed in some other way, for example jointly cut or shaped.

For example, there are electric motors in which coil windings, in particular of the stator, are formed from different wire pieces, the ends of which are then connected to one another. Devices and methods for connecting wire ends of hairpins in order to form stator windings of electric machines have already been proposed in which the wire ends are welded to one another. Here, devices and methods for positioning and bracing the wire ends before the welding process are provided.

In order to be able to correctly weld the wire ends, it is advantageous for the wire ends which protrude out of the individual grooves of the housing of the component, for example after the introduction of hairpins or the like, to firstly be shaped, in particular flared and set, for example in order to thus form wire end pairs which are to be connected to one another.

A wire end shaping device for deforming wire ends, which protrude out of a housing of a component of an electric machine, in a circumferential direction is known for example from U.S. Pat. No. 6,519,993 B2.

The problem addressed by the invention is that of providing devices and methods with which the wire shaping can be performed more reliably than has hitherto been known.

SUMMARY OF THE INVENTION

The invention provides, in accordance with a first aspect thereof, a wire end shaping device for use during production of a component, which is equipped with coils, of an electric machine, for shaping wire ends which protrude from an annular housing of the component, comprising a bending device for bending wire ends in a circumferential direction, a relative movement device for moving the housing and the bending device in a relative manner in an axial direction, and a control unit,
wherein the bending device
has a first receiving and rotating means with a first receiving and rotating unit for receiving first wire ends and for turning the first wire ends for bending in a circumferential direction and with a first drive element for driving the first receiving and rotating unit, and
a second receiving and rotating means with a second receiving and rotating unit for receiving second wire ends, which are radially offset with respect to the first wire ends, and for turning the second wire ends for bending in the circumferential direction and with a second drive element for driving the second receiving and rotating unit,
wherein the first and second receiving and rotating unit are rotatable relative to one another and relative to the housing but are static relative to one another in an axial direction,
wherein the control unit is, for the bending of the wire ends, designed to activate the relative movement device to implement a relative movement between housing and the bending device and, during this, drive the first drive element with a first movement profile and the second drive element with a second movement profile, wherein the first and the second movement profile are configured to differ in a manner dependent on the relative movement such that an axial relative movement of the respective rotating receiving and rotating unit and end regions, engaging therein, of the wire ends is prevented.

In refinements of the invention, the different movement profiles are purely rotational movement profiles. The movement profiles comprise, in particular, purely rotational movements, wherein, as movement parameters, one or more of the parameters rotational directions, rotational speeds, rotational accelerations (in the positive or negative range), starting points, durations of rest or movement and end points may be set so as to vary over time or over the axial relative distance in a manner dependent on the respective bending situation.

It is preferable that the first receiving and rotating unit is designed for receiving and turning relatively long protruding first wire ends and the second receiving and rotating unit is designed for receiving and turning relatively short protruding second wire ends, and that the first movement profile comprises an earlier start of the rotational movement than the second movement profile.

It is preferable that the bending device has a third receiving and rotating means, with a third receiving and rotating unit for receiving third wire ends, which are radially offset with respect to the first and second wire ends, and for turning the third wire ends for bending in the circumferential direction, and a third drive element for driving the third receiving and rotating unit, wherein the control unit is designed to drive the third drive element with a third movement profile, which differs from the first and second movement profile, in a manner dependent on the relative movement between the bending device and the housing.

It is preferable that the bending device has a fourth receiving and rotating means, with a fourth receiving and rotating unit for receiving fourth wire ends, which are radially offset with respect to the first to third wire ends, and for turning the fourth wire ends for bending in the circumferential direction, and a fourth drive element for driving the fourth receiving and rotating unit, wherein the control unit is designed to drive the fourth drive element with a fourth movement profile, which differs from the first to third movement profile, in a manner dependent on the relative movement between the bending device and the housing.

It is self-evidently also possible for an even greater number of receiving and rotating means to be provided, with, in each case, one receiving and rotating unit which is rotatable in accordance with a dedicated movement profile. Preferably, the number of receiving and rotating means corresponds to the number of wire ends which protrude from each groove of the housing.

It is preferable that the control unit is designed to activate the relative movement device to implement the axial relative movement with a uniform speed, and to activate the drive elements such that at least one, multiple or all of the movement profiles cause a rotational movement with a varying rotational speed.

It is preferable that the control unit is designed to activate the relative movement device to implement the axial relative movement with a uniform speed, and to activate the drive elements such that at least one, multiple or all of the movement profiles cause a rotational movement with a gradually or uniformly changing rotational speed.

It is preferable that the control unit is designed to activate the relative movement device to implement the axial relative movement with a uniform speed, and to activate the drive elements such that at least one, multiple or all of the movement profiles cause a rotational movement with a rotational speed which increases or decreases in a continuous manner and/or to an increasing or decreasing extent.

It is preferable that the control unit is designed to activate the relative movement device to implement the axial relative movement with a uniform speed, and to activate the drive elements such that at least one, multiple or all of the movement profiles cause a rotational movement with a changing rotational speed such that an axial relative movement of the respective rotating receiving and rotating unit and end regions, engaging therein, of the wire ends is prevented.

It is preferable that the control unit is designed to activate the relative movement device to implement the axial relative movement with a uniform speed, and to activate the drive elements such that at least one, multiple or all of the movement profiles cause a rotational movement with movement parameters adapted to different lengths of the wire ends to be received in each case.

It is preferable that the receiving and rotating units are each formed by or have a setting crown.

It is preferable that bending edges formed on the receiving and rotating units are all situated substantially in the same plane extending in a radial and circumferential direction.

It is preferable that the wire end shaping device comprises a clamping device which is arrangeable between the housing and the bending device and which serves for fixedly holding the wire ends on the housing during the bending by the bending device.

It is preferable that the clamping device has a first clamping means, which is fixable to the housing or in a positionally static manner, and a second clamping means, which is movable relative to the first clamping means in order to clamp wire ends between the first clamping means and the second clamping means.

It is preferable that the clamping device is arranged on a housing holder which is rotatable and/or axially movable relative to the bending device.

It is preferable that the clamping device has rounded and/or beveled bending formations or rounded and/or beveled bending edges for the abutment and shaping of the wire ends during the bending.

It is preferable that the clamping device has a first clamping means, which is fixable to the housing or in a positionally static manner, and a second clamping means, which is movable relative to the first clamping means in order to clamp wire ends between the first clamping means and the second clamping means.

It is preferable that the first clamping means is of disk-shaped and/or annular form.

It is preferable that the first clamping means is designed for support against inner wall regions of the housing, which inner wall regions are arranged between grooves of the housing. The wire segments which have wire ends can be arranged in said grooves.

It is preferable that the first clamping means has multiple segments which are radially movable for the purposes of fixing to inner wall regions of the housing, which inner wall regions are arranged between grooves of the housing, in which grooves the wire segments which have wire ends can be arranged.

It is preferable that the first clamping means has radially movable segments and an axially movable drive element for jointly driving the radial movement of the segments by means of a conical control surface.

It is preferable that the first clamping means has a first clamping region for abutment against radially inner sides of wire ends, arranged radially at the inside, of the wire ends protruding out of the grooves of the housing.

It is preferable that the clamping device has a number of radially movable clamping fingers for fixedly clamping the wire ends.

It is preferable that the clamping fingers are formed on the second clamping means.

It is preferable that the clamping fingers are formed on the second clamping means and are designed to clamp the wire ends to the first clamping means.

It is preferable that the clamping fingers are formed on the second clamping means and have, in each case, one engagement end for engaging into a corresponding complementary cutout on the first clamping means. Preferably, the engagement end is received in the cutout with such a degree of play that easy insertion and removal of the clamping finger in a radial direction is made possible. Preferably, the respective engagement ends, when in the state in which they have been inserted into the cutout, can be supported on the cutout in order to support the clamping fingers against a displacement in an axial direction and/or circumferential direction.

It is preferable that the clamping device have rounded bending formations for the shaping at the wire ends during the bending process. Preferably, the clamping device has a group of first rounded bending formations for the shaping during bending of wire ends in a radial direction and has a group of second rounded bending formations for the shaping during bending of the wire ends in a circumferential direction.

The bending formations are preferably formed as rounded bending edges.

It is preferable that at least one of the bending formations is formed on each of the clamping fingers. Preferably, at least one first bending formation for the shaping during bending of the wire ends in the radial direction and at least one second bending formation for the shaping during the bending in a circumferential direction are provided on each clamping finger. Preferably, the first and the second bending formations are designed as edges which adjoin one another at a corner, in particular, edges of a step or receiving groove on the clamping finger for the wire ends.

It is preferable that the clamping fingers are formed in a number which corresponds to the number of groups of wire ends which are to be clamped together.

It is preferable that the clamping fingers are formed in a number which corresponds to the number of grooves of the housing of the component to be produced.

It is preferable that the clamping fingers are each designed for jointly clamping all of the wire ends which jointly protrude from the associated groove of the housing.

It is preferable that the clamping fingers are guided on a holding ring so as to be radially displaceable in a jointly or synchronously driven manner.

It is preferable that the clamping fingers each have a second clamping region, formed at a step, for abutment against a radially outer side of the radially outer wire end of the wire ends which protrude from the associated groove of the housing.

It is preferable that the clamping fingers each have a conically tapering tip at the free end.

It is preferable that the clamping fingers have a step at their free ends such that a receiving groove for two, three, four, five, six or more wire ends which jointly protrude from the associated groove of the housing is formed between adjacent clamping fingers situated in a clamping position.

It is preferable that the receiving groove is delimited, at one side running substantially in a radial direction and at one side running substantially in a circumferential direction, by one clamping finger, and at another side running substantially in a radial direction, by the other clamping finger, and is open at another side running substantially in a circumferential direction.

It is preferable that the bending device has at least one radial support means for radially supporting wire ends during the shaping.

It is preferable that the bending device has an inner radial support means for radially supporting wire ends on a radially inner side.

It is preferable that the bending device has an outer radial support means for radially supporting wire ends on a radially outer side.

It is preferable that the at least one radial support means is designed as a sleeve.

It is preferable that the at least one radial support means or at least one or more of multiple radial support means is axially movable.

It is preferable that the at least one radial support means has a flexible support region.

It is preferable that the at least one radial support means is movable such that the movement stops when an abutment is reached.

It is preferable that the controller is designed so as to activate the at least one radial support means such that the at least one radial support means, before the shaping of the wire ends, moves axially out from a retracted position into a supporting position and, after the shaping of the wire ends, moves axially back in from the supporting position into the retracted position.

According to a further aspect, the invention provides a component production device for producing a component, which is equipped with coils, of an electric machine, comprising a wire end shaping device according to any of the preceding refinements.

According to a further aspect, the invention provides a wire end shaping method, which can be and/or is to be performed during the course of the production of a component, which is equipped with coils, of an electric machine, for shaping wire ends which protrude from an annular housing of the component, comprising the following steps:

a) providing or using a bending device which has a first receiving and rotating unit, rotatable about an axis of rotation, for receiving first wire ends and which has a second receiving and rotating unit, rotatable about an axis of rotation, for receiving second wire ends which are radially offset with respect to the first wire ends, wherein the receiving and rotating units are rotatable relative to one another but are static or held relative to one another in an axial direction, and b) moving the housing and the bending device in a relative manner in order to introduce the first wire ends into the first receiving and rotating unit and the second wire ends into the second receiving and rotating unit and in order to compensate an axial change in length of wire ends during a bending operation, c) rotating the first receiving and rotating unit relative to the housing in order to bend the first wire ends after end regions of the first wire ends have been introduced into the first receiving and rotating unit, and rotating the second receiving and rotating unit relative to the housing in order to bend the second wire ends after end regions of the second wire ends have been introduced into the second receiving and rotating unit, wherein the rotation of the first and second receiving and rotating units is performed with different movement profiles in a manner dependent on the axial relative movement and on the axial length of the wire ends such that an axial relative movement between the end regions of the wire ends and the respective receiving and rotating unit is prevented.

It is preferable that the axial relative movement in step b) is performed with a uniform speed and the rotation in step c) is performed in each case with a varying rotational speed.

It is preferable that, in step a), the bending device with a third receiving and rotating unit for receiving third wire ends, which are radially offset relative to the first and second wire ends, and for turning the third wire ends for the purposes of bending in the circumferential direction is provided or used, wherein the third receiving and rotating unit is rotatable relative to the first and second receiving and rotating unit about the axis of rotation but is axially static or held and, in step c), after the introduction of end regions of the third wire ends, is rotated such that a relative movement of the end regions in the third receiving and rotating unit is prevented.

It is preferable that, in step a), the bending device with a fourth receiving and rotating unit for receiving fourth wire ends, which are radially offset relative to the first to third wire ends, and for turning the fourth wire ends for the purposes of bending in the circumferential direction is provided or used, wherein the fourth receiving and rotating unit is rotatable relative to the first to third receiving and rotating unit about the axis of rotation but is axially static or held and, in step c), after the introduction of end regions of the fourth wire ends, is rotated such that a relative movement of the end regions in the fourth receiving and rotating unit is prevented.

The first and second wire ends and possibly the third and/or fourth wire ends may protrude with an equal length, and the movement profiles may each correspondingly, in a manner dependent on the equal length, be configured differently in accordance with the different bend angles to be implemented. In another method approach, it is preferable that the wire ends protrude with different lengths, in particular such that wire ends situated radially further to the outside have, at the start, a greater axially protruding length than wire ends situated radially further to the inside. In such a case, the movement profiles are configured to differ in a manner dependent on the different bend angles to be implemented and on the different protruding lengths.

It is preferable that the rotational movements of the individual receiving and rotating units are correspondingly, in the case of different lengths of the wire ends to be bent in each case, started at correspondingly different points in time.

It is preferable that the rotational movements of all receiving and rotating units and the relative movement between housing and bending device are ended at the same time.

A preferred refinement of the wire end shaping method comprises the following step:

d) clamping the wire ends, by means of a clamping device arranged between the housing and the bending device, during the bending process.

Step d) preferably comprises the following step:

fixing a first clamping means to the housing or in a positionally static manner, and moving a second clamping means relative to the first clamping means in order to clamp the wire ends between the first and the second clamping means.

Step d) preferably comprises the following step:

jointly clamping all wire ends which protrude out of a groove of a housing.

Step d) preferably comprises the following step:

supporting a first of multiple clamping means, which are movable relative to one another, against inner wall regions of the housing, which inner wall regions are arranged between grooves of the housing.

Step d) preferably comprises the following step:

radially moving multiple segments of a first of multiple clamping means, which are movable relative to one another, in order to fix the first clamping means to the housing and/or for the purposes of release from the housing.

Step d) preferably comprises the following step:

driving, by means of an axially movable drive element, a radial movement of multiple segments of a first of multiple clamping means, which are movable relative to one another, in order to fix the first clamping means to the housing and/or for the purposes of release from the housing, and jointly transmitting the axial movement to the segments by means of a control surface or a conical surface.

Step d) preferably comprises the following step:

abutting a first clamping region, which is formed on a first of multiple clamping means, which are movable relative to one another, against radially inner sides of wire ends, arranged radially at the inside, of the wire ends protruding out of the grooves of the housing.

Step d) preferably comprises the following step:

radially moving a number of clamping fingers, provided correspondingly to the number of groups of wire ends to be clamped together and/or of grooves in the housing, in order to clamp the wire ends or for the purposes of releasing the clamping.

Step d) preferably comprises the following step:

clamping in each case one group of the wire ends between a first clamping means and in each case one radially movable clamping finger of a second clamping means.

Step d) preferably comprises the following step:

supporting clamping fingers, which are moving into a clamping position, against displacement in a circumferential direction or in an axial direction.

Step d) preferably comprises the following step:

supporting clamping fingers, which are moving into the clamping position, against displacement in a circumferential direction or in an axial direction by means of positively locking engagement of each clamping finger into one or on a complementary grasping unit.

Step d) preferably comprises the following step:

supporting clamping fingers, which are moving into the clamping position, against displacement in a circumferential direction or in an axial direction by means of positively locking engagement of a tip of each clamping finger of a second clamping means into a corresponding tip receptacle groove on a first clamping means.

Step d) preferably comprises the following step:

deforming the wire ends by abutment against bending formations or bending edges arranged on the clamping device.

Step d) preferably comprises the following step:

jointly and/or synchronously driving the radial movement of clamping fingers in order to clamp the wire ends.

Step d) preferably comprises the following step:

jointly guiding the radial movement of clamping fingers on a holding ring.

Step d) preferably comprises the following step:

receiving the two, three, four, five, six or more wire ends, which are to be clamped and which jointly emerge from a groove of the housing, in a receiving groove which is formed by adjacent clamping fingers at the free ends thereof, wherein the receiving groove is delimited, at one side running substantially in a radial direction and at one side running substantially in a circumferential direction, by one clamping finger, and at another side running substantially in a radial direction, by the other clamping finger, and is open at another side running substantially in a circumferential direction.

Step c) preferably comprises the following step:

c1) radially supporting at least some of the wire ends on a radially inner side and/or on a radially outer side during the bending process.

Step c1) preferably comprises the following steps:

axially moving at least one radial support means out from a retracted position into a supporting position before the bending process and axially moving the at least one radial support means in from the supporting position into a retracted position after the bending process.

A preferred field of use for the above-described devices, methods and uses according to the invention is the production of components, which are equipped with coils, of an electric machine, and, more particularly, the production of stators of electric machines, and, more particularly, the production of stators of electric motors which as traction motors for electric motor vehicles, in particular in the power range from 10 kW to 400 kW. The devices, the method and use of the present invention, and of the advantageous refinements thereof, are suitable and usable, in particular, in the field of the production of electric motors or other electric machines, for example generators, which are configured for high power, reliable operation and high efficiency. In particular, it is the intention to produce electric motors which are usable as traction motors of electric vehicles or hybrid vehicles and which have, for example, a nominal power of between 20 kW and 400 kW. For the construction of stators of such powerful electric machines, it is advantageous to provide as high a coil density as possible. In particular, for this purpose, so-called hairpins are inserted into grooves of a stator housing, which grooves have previously been lined with a groove insulator, in particular groove insulating paper. Subsequently, the free wire ends are shaped in a radial direction—flared/"flaring"—and shaped in a circumferential direction—"setting"—in order to form pairs of wire ends which are to be connected, in particular welded, to one another, such that closed coil windings can then be produced. Preferably, for this purpose, use is made of wires which are of not circular but rather rectangular form in cross section. The devices and methods and uses proposed here have the advantage that the bending can be performed in a more exact and more controlled manner.

In particular, the invention relates to a device for the shaping, directed in a circumferential direction, of bar-type conductors in electric machines.

During preferred production of stators, the conductors are firstly produced. These conductors are subsequently fitted into a laminated core. In the case of hairpins being used to produce the coils, wire ends then protrude at one end of the stator housing formed as a laminated core. Here, two, three, four or even more wire ends may also protrude closely adjacently to one another in each groove of the housing. For the further processing, it is advantageous for these conductor ends to be flared, for which purpose they are preferably firstly shaped in a radial direction. It is the intention for this process to be performed in an automated manner.

For the subsequent (automated) processes (in particular, setting and connecting of the wire ends to form coil windings), it is advantageous for the conductor ends to be shaped such that the position lies within a predefined tolerance range. From experience, the conductor ends can be particularly effectively shaped in a reproducible manner if they are braced at their free end and at the "foot" (top edge of the laminated core). The radial shaping of the conductor ends results in a shortening of the axial length. To avoid damage to the conductor ends, it is advantageous for the length compensation to be counterbalanced by means of a translational movement of the stator/shaping tool.

Preferred devices and methods according to the present invention can be particularly advantageously used on housings with the wire ends that have correspondingly been flared as described above. Preferred refinements of the invention are then preferably used for shaping the wire ends in a circumferential direction, preferably such that pairs of wire ends which are to be connected to one another can be formed, in order to thus close coil windings.

In combination with the clamping device according to one of the refinements mentioned above, a preferred refinement of the wire end shaping device makes possible the reproducible shaping of conductor ends, in particular by means of the individual processing of each conductor end.

The invention relates, in particular, to methods and devices for bending end portions of bar-type conductors, in particular of bar-type windings of electric machines.

In order to make the electrical interconnection of stators possible, in one process step in one advantageous refinement, the end portions of bar-type conductors are twisted. For this process step, the individual pins are firstly produced and fitted into a laminated core. In the case of a small spacing between the end portions of the bar-type conductors after the joining process, said end portions are preferably flared in a subsequent step in order to make precise twisting (setting) possible. Preferably, the end portions of the bar-type conductors are, for the flaring, shaped in a radial direction in order to produce a spacing between the individual conductors (flaring process).

In the case of stators, multiple conductors are arranged in one groove. Preferably, all conductors which lie on one radius after the flaring process are processed using one tool (in particular, arranged on a receiving and rotating unit). During this processing, all conductor ends are preferably firstly introduced into pockets of the tool and subsequently twisted (rotation of the tool about a central axis). This twisting causes a shortening of the bar-type conductors in an axial direction. To prevent a relative movement from occurring between the bar-type conductors and the tool (for example, setting crown) and damage being caused to the bar-type conductors or the insulation thereof, the stator or the tool (for example, the setting crown) is preferably caused to perform a follow-up movement in an axial direction. This movement follows a complex speed profile because the bar-type conductors are three-dimensionally deformed.

Preferably, radially adjacent bar-type conductors are twisted in opposite directions, such that at least two tools (for example, setting crowns) are used.

After the setting process, it is advantageous if all conductor ends have the same length in an axial direction (measured from the top edge of the laminated core). Owing to the different, radius-dependent deformation of the conductors during the setting process, it is preferable that the hairpins have a different length before the process. Accordingly, in the case of a housing of a stator before the flaring process, conductor ends preferably protrude to different lengths in a manner dependent on the radius—with increasing radius, the length in an axial direction also increases. In the case of a flared stator (the conductor ends have been radially shaped), the radial spacings between the wire ends have been increased, and the wire ends lie in predetermined tolerance ranges, such that the introduction into the pockets during an automated setting process is facilitated. A housing with wire ends that have been flared in a radial direction thus forms the preferred starting state for the setting process.

Devices and methods according to particularly preferred refinements of the invention offer, in particular, the advantages that a relative movement between the individual bar-type conductors and the setting tool can be prevented with a relatively simple mechanical structure in order to prevent damage to the conductors. For this purpose, it is preferable for each receiving and rotating unit (in particular, with setting crown) to follow a rotational and translational speed profile.

If all tools (for example, setting crowns) for the wire ends protruding with different radial positions were now to rotate at the same speed (and with the same starting time), a different axial stroke would be necessary, which would lead to a correspondingly complex mechanical structure for permitting the different axial stroke of the different tools.

In the case of preferred devices and methods according to the invention, different receiving and rotating units are moved with different speed profiles, such that it is merely necessary for the entire housing (for example, of a stator) to be axially moved—this is made possible with the individual angular speed of each receiving and rotating unit (for example, with setting crown).

Preferably, in order to prevent a relative movement and keep the number of drives low, the setting process is newly defined: the setting crowns or similar tools are moved only in rotation in order to make the twisting possible. The tools (for example, setting crowns) may be displaced into one another, such that the bending edge is situated at the same (axial) height in the case of all tools.

Preferably, the housing (for example, of a stator) is moved at a constant speed in an axial direction as far as the end position (after the setting process). In order to avoid the above-stated disadvantages, the tools (for example, setting crowns) are moved in rotation with an individual speed profile. In the case of an equal setting angle (twist angle), the conductors lying on a relatively large radius would, owing to their deformation, require a greater axial stroke than conductors on a relatively small radius. To adapt this, it is preferable if not the axial stroke for the different wire ends but rather the setting angle/twist angle is adapted.

In relation to the prior art, advantageous refinements of the invention make the individual movement of the individual tools (for example, setting crowns) possible with a small number of drives.

In the case of a preferred course of the relative axial movement between the housing and the bending device, the housing moves at a constant speed axially in the direction of the bending device (for example, with the setting crowns) proceeding from a time t0. Preferably, the outermost receiving and rotating unit (for example, with setting crown) K1 begins to rotate at a defined time t1.

The outermost receiving and rotating unit K1 furthermore preferably rotates with increasing speed in order to counterbalance the (axial) length compensation that arises as a result of the deformation, and in order to prevent a relative movement. As soon as the housing has reached a defined axial spacing, the closest receiving and rotating unit (for example, with a second setting crown) K2 situated further to the inside furthermore preferably begins to twist the conductors. The second receiving and rotating unit rotates preferably in the opposite direction to the first receiving and rotating unit K1.

The second receiving and rotating unit preferably begins to rotate with a higher starting speed than the first receiving and rotating unit.

The speed of the second receiving and rotating unit K2 preferably also increases.

In a preferred case in which the second receiving and rotating unit twists shorter wire ends than the first receiving and rotating unit, it is furthermore preferable that the speed of the second receiving and rotating unit K2 is higher than that of the first receiving and rotating unit K1. It is thus possible that, even in the case of a later starting time, the same twist angle has been passed through at the end of the setting process (tS). The further receiving and rotating units with the further crowns K3 and K4 preferably behave in a manner equivalent to that which has been described on the basis of the movement of the first and second receiving and rotating units.

In a preferred construction of the bending device, which is designed, for example, as a setting device, each of the setting crowns is driven by means of an NC axis (for example electric lifting cylinder). For example, six setting crowns are used Particularly preferred refinements of the invention provide radial support of wire ends during the shaping in a circumferential direction. Advantageous features and advantages of such refinements will be discussed below.

Preferred refinements of the invention relate to a supplementation of the embodiments of a setting device discussed above. Radial support means, which are designed preferably as axially movable sleeves on the inner and outer sides, serve for the guidance of the hairpin in the setting process.

During the setting, if no inner radial support means—inner sleeve—is provided, there is the tendency for the wire ends to deform, as viewed in a radial direction, along the shortest path between stator and setting crown, that is to say, to change from the curved shape generated as a result of the preceding flaring to a substantially straight shape, owing to the tensile stress generated in the non-guided free wire ends as a result of the setting.

To at least partially prevent this, in preferred embodiments, the undesired deformation of the wire ends in a radial direction during the setting is limited by the inner sleeve.

Furthermore, during the setting, the outer wire has a tendency to buckle where the wire end enters the cutout of the setting tool. This is prevented by means of an outer radial support means—in particular outer sleeve.

The radial support improves the setting result such that the risk of the occurrence of wire damage in the setting process is further minimized, and the specifications with regard to structural space limitations can be even better adhered to.

A particularly advantageous approach for the shaping of the wire ends in a circumferential direction (setting) will be described below:

Before the setting process, the pin ends are introduced into the setting tools.

Moving an inner and an outer guide sleeve (examples for an inner and an outer radial support means) out into the upper end position, that is to say, out of the setting device in the direction of the stator. In order to prevent a collision of the inner sleeve with the stator or the collar support fingers of the clamping device, said inner sleeve is particularly preferably of flexible design. For this purpose, in one preferred refinement, said inner sleeve is designed such that it moves no further once it has made abutting contact.

Setting process.

Moving the clamping device together with the stator upward to such an extent that the pin ends are (just) still positioned in the pockets of the setting tools (it is preferable for not the setting device, but rather only the stator and the clamping device, to be axially displaceable).

Moving the inner and the outer guide sleeve into the lower end position, that is to say, back into the setting device.

(Comb-like) positioning fingers of a positioning device are moved between the wires in order to fix the wire ends after they have been pulled out of the setting tool, in order to enable said wire ends to be introduced, in the state thus fixed, into cutouts of a welding template.

Since the positioning fingers of the positioning device are radially advanced directly above the setting crowns, that is to say, in the vicinity of the wire ends, it is advantageous for the guide sleeves to be axially moved, that is to say, moved in, after the setting and before the radial advancing of the positioning fingers.

In the case of a process which does not require the positioning fingers, an axial movement (inward movement) of the guide sleeves is not imperatively necessary.

It is, however, preferable for the inner sleeve to be designed to be movable or at least flexible in order to avoid gaps between the sleeve and the stator or the clamping device. This does not apply to the outer sleeve, because its region of action lies in the immediate vicinity of the setting tool and therefore a gap can be present in the direction of the stator, or is even advantageous owing to the displacement of the stator during the setting process. The inner sleeve is moved with a predetermined pressure, for example of 3-4 bar, against the stop, which in refinements of the invention is formed, for example, by the interior of the clamping device.

If, during the setting process, the spacing between setting device and stator or clamping device is reduced, the inner sleeve preferably correspondingly moves conjointly. By contrast, the outer sleeve preferably has a gap in the direction of the stator or clamping tool, and therefore does not need to be designed to be movable during the setting process.

A movable or flexible inner sleeve yields the following advantages:

despite the axially changing spacing of setting crowns and laminated core/clamping device during the setting process, the hairpins can be optimally guided at all times. This is preferably achieved by virtue of the inner sleeve being moved out and, during the setting process, being pushed axially downward by the clamping device with pressure reduction, that is to say being movable in a flexible manner, and not rigid.

For the purposes of automating a sub-process during the course of the production of a component, which is to be equipped with coils, of an electric machine, preferred refinements of the invention therefore provide a wire end shaping device for use during production of a component, which is equipped with coils, of an electric machine, for shaping wire ends which protrude from an annular housing of the component, comprising a bending device for bending wire ends in a circumferential direction, a relative movement device for moving the housing and the bending device in a relative manner in an axial direction, and a control unit. Here, the receiving and rotating units, which receive the wire ends, of the bending device are held so as to be axially static relative to one another, wherein differences in length compensation and/or in a turning angle of the wire ends are handled by means of different movement profiles of the rotational movements of the receiving and rotating units. A component production device and a wire end shaping method are also described.

According to a further aspect, the invention also provides a computer program product, with program commands which, when loaded onto a computer, in particular a control unit of a wire shaping device, activate the wire shaping device to carry out one of the methods according to the appended claims.

The device according to one or more of the appended device claims is designed for carrying out a method according to one or more of the appended method claims. The method according to one or more of the appended method claims can be performed by means of a device according to one or more of the appended device claims.

Although specific exemplary embodiments are described for the purposes of explaining the invention, further exemplary embodiments are disclosed to a person skilled in the art by this in that one or more of the described features may be omitted or replaced by alternative means.

BRIEF DESCRIPTION OF THE DRAWINGS

Exemplary embodiments of the invention will be discussed in more detail below on the basis of the appended drawings, in which:

FIG. 19 is a perspective illustration of a fourth receiving and rotating unit of the circumferential bending device, wherein a ring element for forming wire end receptacles has been omitted for explanatory purposes;

FIG. 20 shows a side view of a first receiving and rotating unit;

FIG. 21 shows a section through the first receiving and rotating unit along the line B-B of FIG. 20;

FIG. 22 shows a perspective view of the first receiving and rotating unit;

FIGS. 34a and 34b are schematic diagrammatic illustrations for explanation of the function of a radial support means provided in a further embodiment of the circumferential bending device;

FIG. 36 shows a view as in FIG. 36 with the first and the second radial support means in a supporting position.

DETAILED DESCRIPTION OF THE PREFERRED EMBODIMENTS

Figure 1:
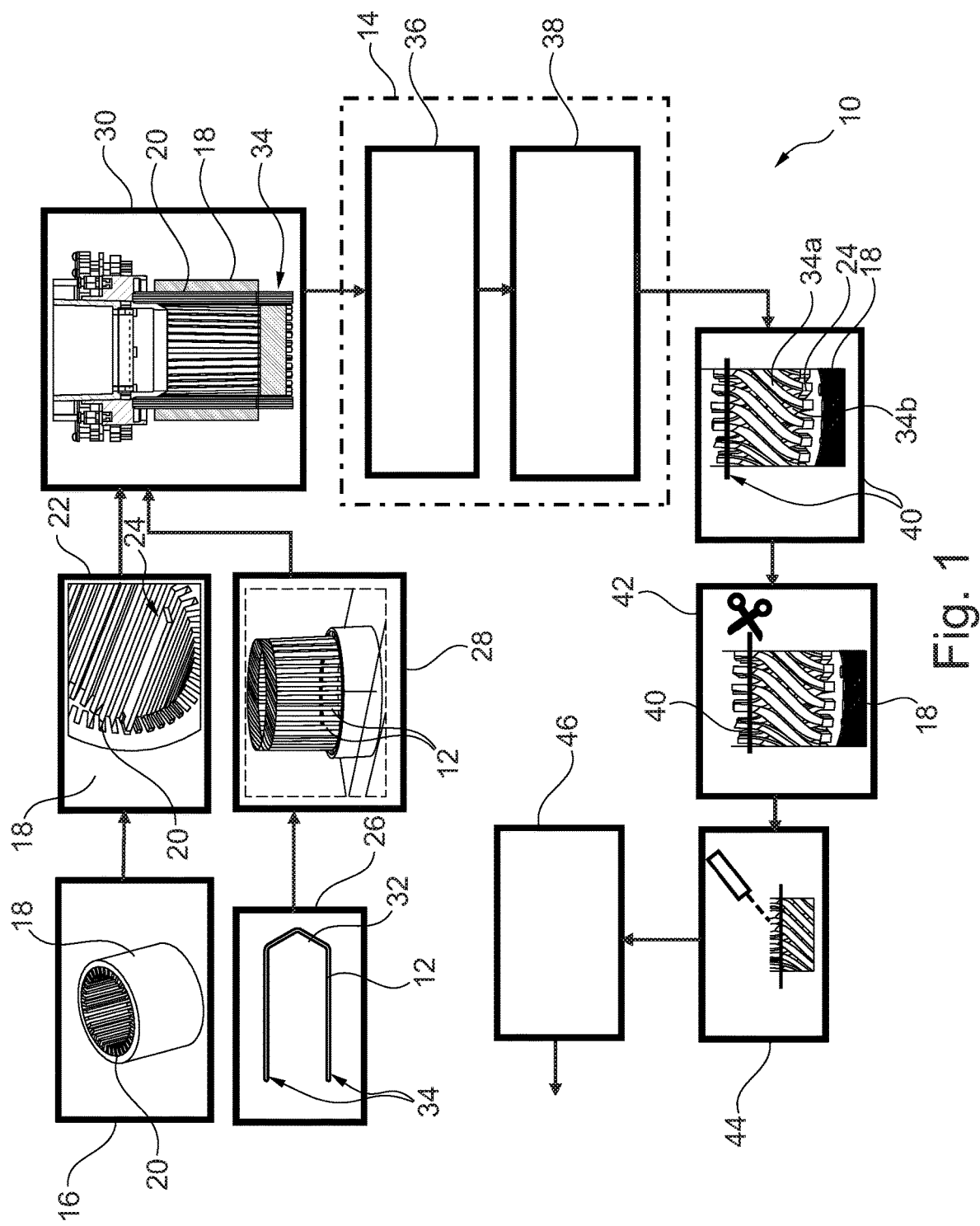
FIG. 1 is a schematic block illustration of an exemplary embodiment of a component production device for producing a component, which is equipped with coils, of an electric machine.

FIG. 1 illustrates an exemplary embodiment of a component production device 10 for producing a component, which is equipped with coils, of an electric machine in a block diagram, whereby production steps of a corresponding component production method for producing the component are also illustrated.

The component production device 10 is, in particular, suitable for producing a stator of an electric machine. The stator is configured to be used, in particular, as a stator of a traction motor of an electric vehicle, preferably in the power range from 20 kW to 400 kW. For this purpose, the stator should be provided with as large as possible a number of coils, wherein the coils may be produced from so-called hairpins 12.

In the illustrated embodiment, the component production device 10 has a wire end shaping device 14 and preferably one or more or all of the additional stations mentioned in more detail below.

The component production device 10 preferably has a housing production device 16 for producing a housing 18 of the component, which is designed and configured, for example, as a stator. The housing production device 16 is, for example, designed and configured in a fundamentally known manner to produce the housing 18 as a laminated core from individual laminations, wherein the housing 18 is of annular form and, on an inner wall region, is equipped with a series of housing grooves 20 which are formed so as to be distributed over the inner wall and which serve for receiving wire segments.

The component production device 10 preferably has a device 22 for producing groove insulators, by means of which the individual housing grooves 20 are equipped with a groove insulator 24, preferably composed of insulating paper. The device for producing groove insulators 22 is preferably designed and configured in the manner described in more detail in the German patent application DE 10 2017 129 474.0, wherein, for further details, reference is expressly made to said German patent application DE 10 2017 129 474.0 which is incorporated herein by reference.

The component production device 10 furthermore has a hairpin production device 26 for producing the hairpins 12. The hairpin production device 26 may, for example, have cutting devices (not illustrated) for cutting wire pieces from a wire coil and bending devices (not illustrated in any more detail) for bending the hairpin 12 into a roof-shaped bend and/or kinked bend and/or 3-dimensional bend.

The component production device 10 preferably has a pre-positioning device 28 for pre-positioning the hairpin 12 and a hairpin insertion device 30 for inserting the thus pre-positioned hairpin 12 into the housing grooves 20 of the housing 18.

Possible embodiments of the pre-positioning device 28 and of the hairpin insertion device 30 are presented and described in more detail in the German patent application DE 10 2017 113 617.7, which is incorporated herein by reference for further details.

As indicated at the hairpin production device 26, the hairpins 12 have a bent winding head 32 and two free wire ends 34, wherein said hairpins are equipped with an insulator, for example a plastics coating, at each wire end 34, with the exception of the outermost end region. After the hairpin insertion by means of the hairpin insertion device 30, the wire ends 34 protrude from the housing grooves 20 at one end of the housing 18.

The wire end shaping device 14 serves for performing a flaring process, in which the individual wire ends 34 are flared in a radial direction, and for performing a setting process, wherein the thus flared wire ends 34 are shaped in a circumferential direction in order to thus each form pairs of wire ends 34 which are to be connected to one another.

For this purpose, the wire end shaping device 14 has a radial wire end shaping device 36 and a circumferential wire end shaping device 38.

The component production device 10 may furthermore have a preloading and/or fixing device 40 for preloading and/or fixing the individual pairs of wire ends 34. An exemplary embodiment of the preloading and fixing device 40 is presented and described in the German patent application DE 10 2017 114 932.5, which is incorporated herein by reference for further details.

The component production device 10 may furthermore comprise a wire end cutting device 42 for cutting the wire ends braced and fixed by means of the preloading and/or fixing device 40.

An exemplary embodiment of the component production device 10 furthermore has a wire end welding device 44 for welding the wire ends 34 which are to be connected to one another to form the coils.

Furthermore, the component production device 10 may comprise devices 46 for electrically contacting the coils thus formed by the hairpins 12 and/or for testing and/or potting the stator thus formed.

Exemplary embodiments of the wire end shaping device 14 of the component production device 10 will be discussed in more detail below.

In the case of the component production device 10 as per the exemplary embodiment illustrated in FIG. 1, for the production of a stator as an example for the component, a housing 18 with housing grooves 20 and groove insulators 24 accommodated therein is firstly provided; at the same time, conductors in the form of hairpins 12 are produced. The conductors in the form of hairpins 12 are subsequently fitted into the laminated core of the housing 18.

Figure 2:
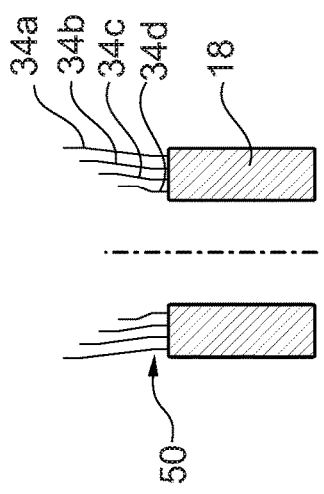
FIG. 2 is a schematic illustration of a housing of the component, which is equipped with coils, before a wire shaping process.
Figure 3:
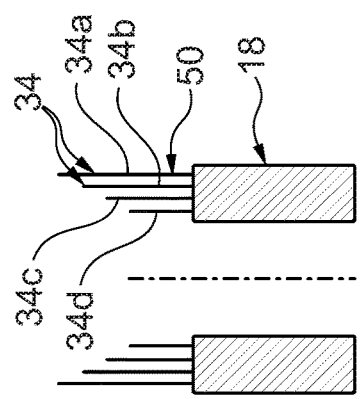
FIG. 3 shows a section through the housing as in FIG. 2 after a shaping of wire ends in a radial direction and before a shaping of the wire ends in a circumferential direction.

A wire end shaping method is subsequently carried out by means of the wire end shaping device 14. The initial state for the wire end shaping method is illustrated in FIG. 2. The sectional illustration in FIG. 2 shows an intermediate product for the production of the stator in a simplified illustration, in particular without the winding head being illustrated. In a first sub-process of the wire end shaping method, the conductor ends—wire ends 34—are radially shaped as illustrated in FIG. 3. This sub-process is also referred to as "flaring". For this purpose, the wire end shaping device 14 has the radial wire end shaping device 36.

Figure 4:
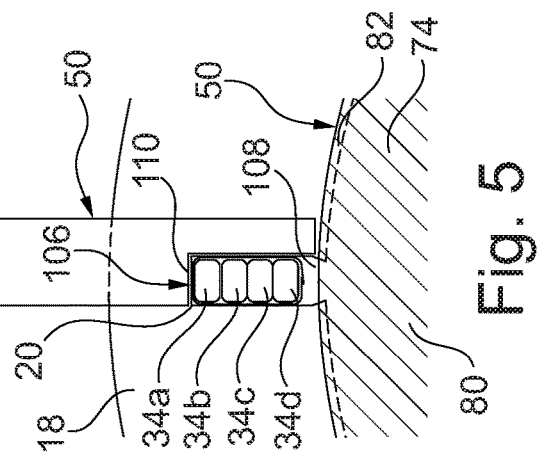
FIG. 4 shows a plan view of a subregion of the housing from above in FIG. 2, wherein a groove of the housing with wire segments, on which wire ends are formed, accommodated therein is illustrated.

In this regard, FIG. 4 shows the plan view from above in FIG. 2 of one of the housing grooves 20. In the illustrated exemplary embodiment, a total of four wire segments 48a-48d with corresponding four wire ends 34a-34d protruding out of the housing groove 20 are illustrated. The wire end shaping method and the wire end shaping devices 14, 36, 38 provided for this are correspondingly designed and configured, in this example, with four wire ends 34a-34d per housing groove 20. In other embodiments which are not illustrated in any more detail, it is, for example, the case that 2, 3, 6, 8 or more or fewer wire ends 34 are provided per groove, wherein the number of corresponding handling elements, as will be presented in more detail further below, is correspondingly adapted.

For the automated processes that follow the flaring process, the wire ends 34a-34d should be shaped such that the position thereof lies within a predefined tolerance range. In order that the wire ends 34a-34d can be shaped in a reproducible manner, they are braced at their free end and at the foot—the upper edge of the housing 18.

For this purpose, a clamping device 50 is provided, exemplary embodiments of which are illustrated in FIGS. 5 and 7-11.

Figure 6:
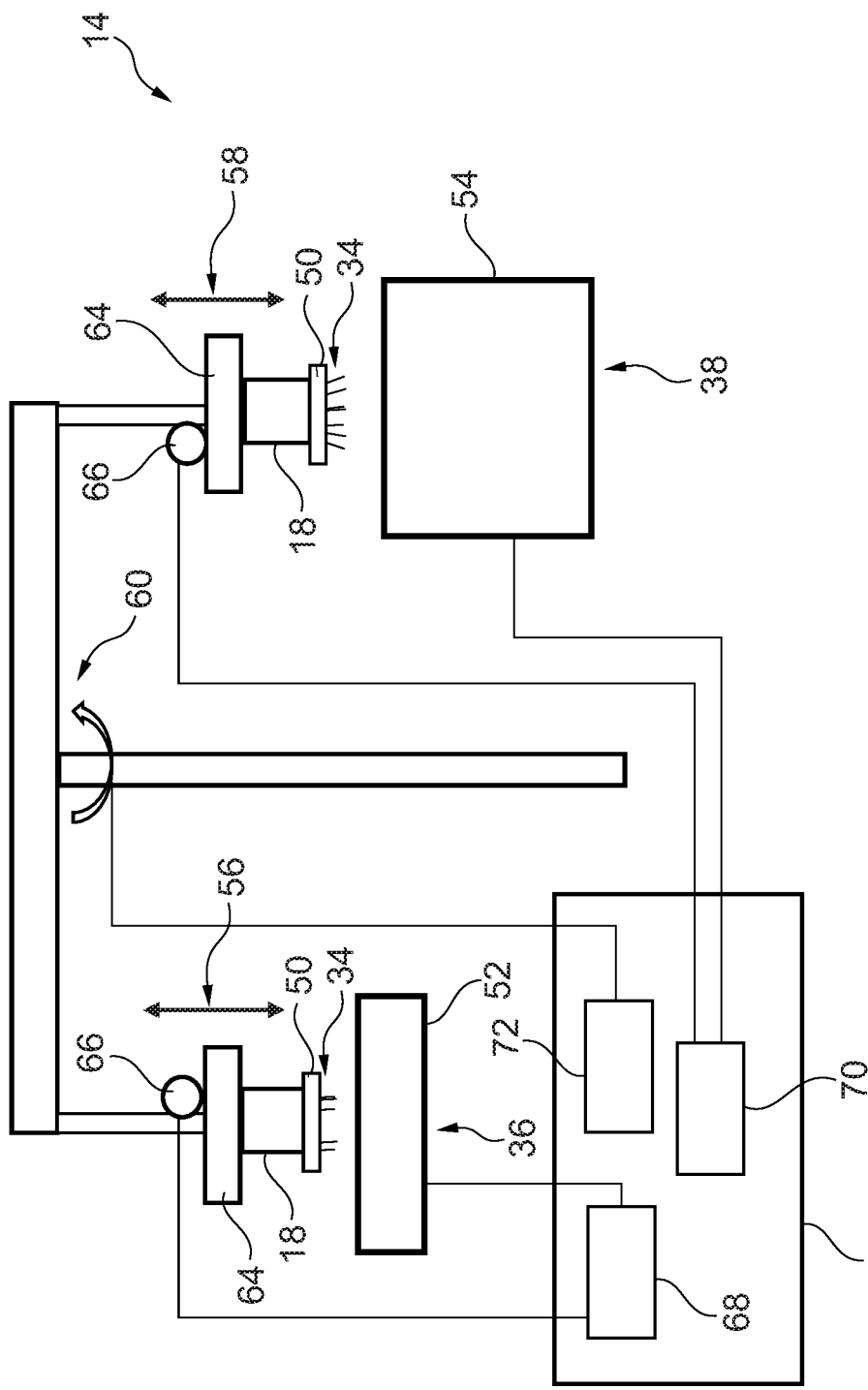
FIG. 6 is a schematic overview illustration of an exemplary embodiment of a wire end shaping device, which has a radial wire end shaping device, for shaping the wire ends in a radial direction, with a radial bending device and the clamping device and has a circumferential wire end shaping device, for shaping the wire ends in a circumferential direction, with a circumferential bending device and the clamping device.

An exemplary embodiment of the wire end shaping device 14 is schematically illustrated in FIG. 6. Accordingly, an exemplary embodiment of the wire end shaping device 14 has the clamping device 50 and at least one bending device 52, 54.

The illustrated wire end shaping device 14 has at least two stations, a first station for the radial shaping of the wire ends 34a-34d and a second station for the shaping of the wire ends 34, 34a-34d in the circumferential direction. These two stations are referred to here as radial wire end shaping device 36 and circumferential wire end shaping device 38.

The radial wire end shaping device 36 has a radial bending device 52 for bending the wire ends 34, 34a-34d in the radial direction.

The circumferential wire end shaping device 38 has a circumferential bending device 54 for the shaping of the wire ends 34, 34a-34d, which have preferably already been radially flared, in the circumferential direction. Furthermore, both stations 36, 38 each have the clamping device 50.

Preferably, the wire end shaping devices 14, 36, 38 each have a relative movement device 56, 58 for moving the housing 18 relative to the respective bending device 52, 54 in an axial direction. In this regard, the "axial direction" is to be understood to mean a movement in a direction along the central axis of the annular housing 18. The radial direction and the circumferential direction are also each defined in relation to this central axis of the housing 18.

A first relative movement device 56 is formed together with the radial bending device 52 and the clamping device 50 at the radial wire end shaping device 36. A second relative movement device 58 is formed together with the circumferential bending device 54 and the clamping device 50 at the circumferential wire end shaping device 38. Furthermore, the wire end shaping device 14 has a transport device 60 for transporting the housing 18 from the radial wire end shaping device 36 to the circumferential wire end shaping device 38 and a control device 62 for controlling the individual units of the wire end shaping device 14.

The transport device 60 may be designed and configured in any form. In the exemplary embodiment illustrated, the transport device 60 has a type of carousel with multiple arms, on which the relative movement devices 56, 58 are formed. The transport device 60 and the relative movement devices 56, 58 may be formed by a robot or a portal machine.

The relative movement devices 56, 58 each have a housing holder 64, on which the housing 18 is held with downwardly directed protruding wire ends 34, 34a-34d, and a housing holder drive 66, by means of which the housing holder 64 is movable in a driven manner relative to the respective bending device 52, 54 in an axial direction. In other refinements, which are presently less preferred, the housing 18 is held in a static manner, and the bending device 54 or 56 is moved axially.

The control device 62 has a first controller for controlling the radial wire end shaping device 36, which first controller activates the housing holder drive 66 of the first relative movement device 56 and the radial bending device 52. Furthermore, the control device 62 has a second controller 70 which activates the housing holder drive 66 of the second relative movement device 58 and the circumferential bending device 54. In the exemplary embodiment illustrated, the control device 62 has a third controller 72 which activates the transport device 60. The control device 62 may be provided locally at the wire end shaping device 14 or may also be a part of a central controller (not illustrated) of the component production device 10. The individual control devices 68, 70, 72 may be implemented in hardware or software form.

The clamping device 50 is preferably used both during the radial shaping of the wire ends in the radial wire end shaping device 36 and during the shaping of the wire ends 34, 34a-34d in the circumferential direction in the circumferential wire end shaping device 38. For this purpose, the clamping device 50 may be transported onward, together with the housing 18, from the radial wire end shaping device 36 to the circumferential wire end shaping device 38 by means of the transport device 60. The clamping device 50 may, for example, also be attached to, or be part of, the housing holder 64. In some embodiments, the clamping device 50 is provided as a separate component.

As illustrated in FIG. 6, the clamping device 50 is, during operation, arranged between the housing 18 and the respective bending device 52, 54.

Figure 5:
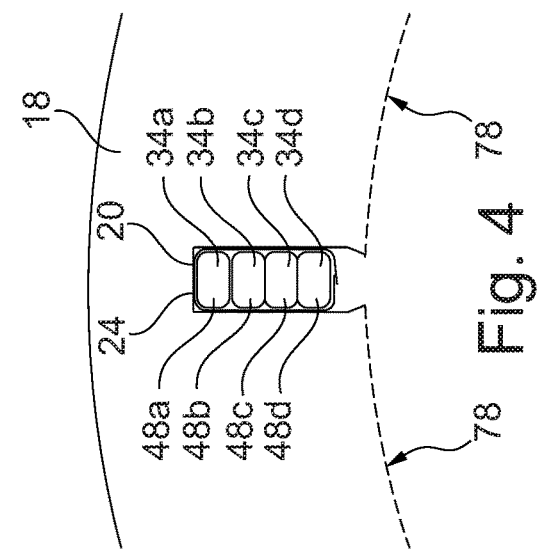
FIG. 5 is an illustration similar to FIG. 4, with a clamping device engaging on the wire ends for the purposes of clamping the latter.

As indicated in FIG. 5, the clamping device 50 has a first clamping means 74, which is preferably designed and configured as an inner clamping means, and a second clamping means 76, which is preferably designed and configured as an outer clamping means.

The first clamping means 74 is preferably arranged partially in the interior of the housing 18 and is furthermore preferably supported against inner wall regions 78 (see FIG.

5) which are formed, in the interior of the housing 18, between the housing grooves 20.

The second clamping means 76 is movable relative to the first clamping means 74 in order to clamp wire ends 34, 34a-34d between the clamping devices 74, 76. It is preferable here for all wire ends 34, 34a-34d which jointly protrude from a housing groove 20 to be clamped between the clamping devices 74, 76.

A first exemplary embodiment of the clamping device 50 will be discussed in more detail below on the basis of FIGS. 5, 7 and 8.

In this embodiment, the first clamping means 74 is of disk-shaped or annular form. The first clamping means 74 has an annular disk body 80 which is fitted with a first subregion into the housing and which is preferably supported against, or fixed relative to, the inner wall regions 78. For this purpose, the annular disk body 80 may, for example, be axially braced in the annular housing 18 by means of a counter-bracing element (not illustrated in any more detail) on the opposite end of the housing. For example, the counter-bracing element may be formed as part of the housing holder 64. A further subregion of the annular disk body 80 protrudes, as indicated in FIG. 5, from the end of the housing 18 and is supported by way of an annular flange 82 against said end of the housing 18. This protruding subregion of the annular disk body 80 is, as illustrated in FIGS. 7 and 8, equipped with a series of cutouts 84 distributed over the circumference, which cutouts serve as tip receptacles 85. The number of cutouts 84 corresponds to the number of housing grooves 20 on the housing 18. The cutouts 84 are radially outwardly open.

The second clamping means 76 has a number of collar support tools in the form of clamping fingers 86. Furthermore, the second clamping means 76 has, in the illustrated exemplary embodiment, a holding ring 87 on which the clamping fingers 86 are received so as to be guided in a jointly and synchronously driven and radially displaceable manner.

The clamping fingers 86 are each of bar-like form and are received with a region in the holding ring 87. The clamping device may be designed and configured, for example, as a manual device without a drive. Here, the clamping fingers 86 are moved manually. In the embodiment illustrated in FIG. 7, cylindrical pins 88 are provided for fixing purposes; it would also be possible for manual clamping to be performed by means of screws 94. In other embodiments (not illustrated), that region of the clamping fingers 86 which is received in the holding ring 87 may in each case have a tooth rack region which meshes with toothed gears (not illustrated) which can be driven jointly by means of protruding toothed-gear shafts. In another embodiment which is likewise not illustrated in any more detail here, a corresponding drive cam is provided instead of a toothed gear.

Furthermore, the clamping fingers 86 may be equipped with spring elements which are not illustrated in any more detail here, for example in each case one pressure spring per clamping finger 86, which spring elements ensure a uniform contact pressure of the clamping fingers 86.

Figure 8:
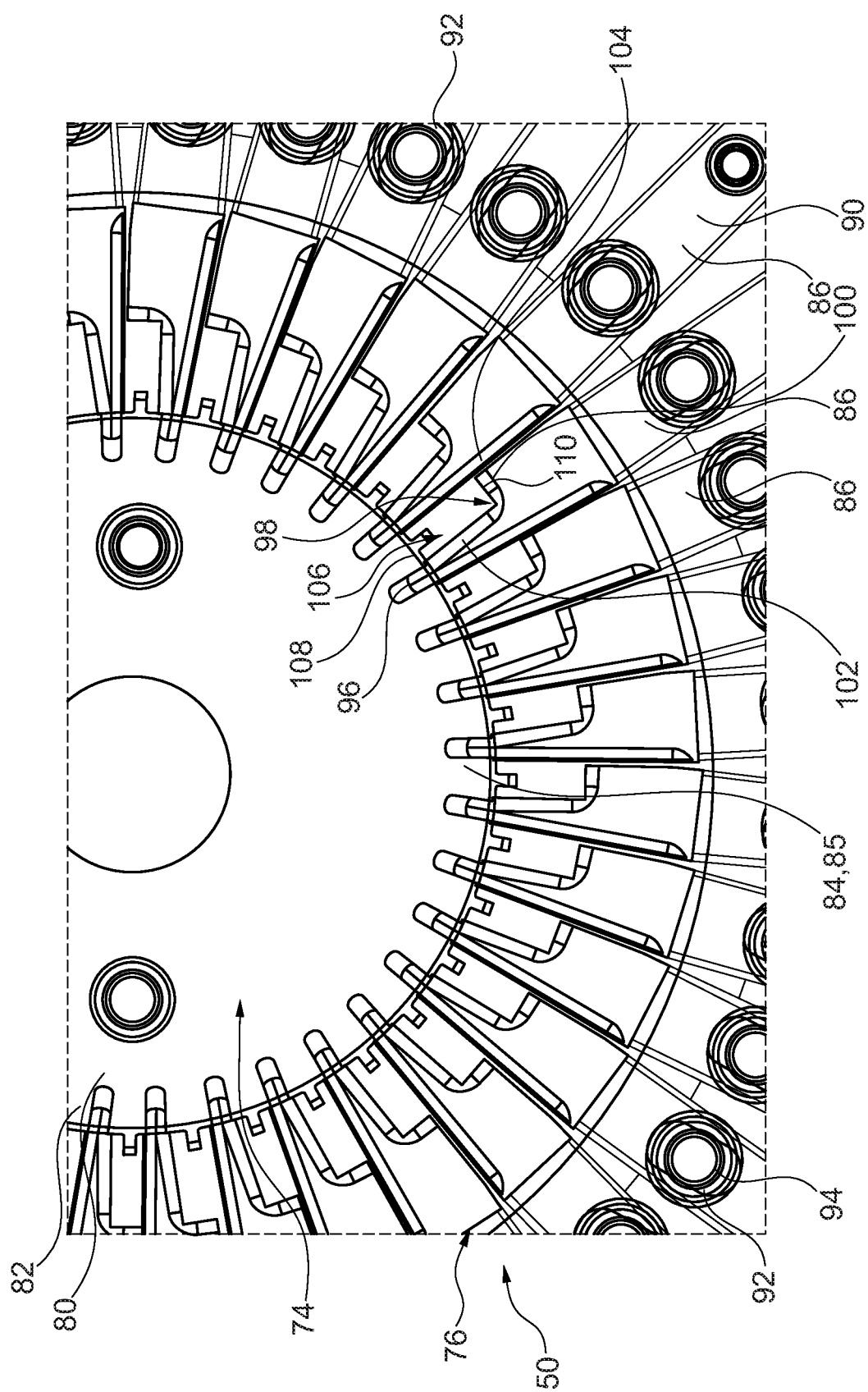
FIG. 8 shows an enlarged plan view of a detail of the clamping device from FIG. 7.

As can be seen most clearly from FIG. 8, a respective rod element 90 of the clamping finger 86, which is guided in the holding ring 87, has a slot 92 which extends in the longitudinal direction of the clamping finger 86 and through which a fastening screw 94 is guided, wherein the shank of the fastening screw 94 limits the displacement movement of the clamping fingers 86 by way of the abutment in the slot 92.

At the inwardly directed ends, the clamping fingers 86 have an engagement end in the form of a conically tapering tip 96, which is designed and configured for engaging into the cutout 84.

Furthermore, each clamping finger 86 has, at its free end, a step 98 which is delimited at one side by the conically tapering tip 96 and which is delimited at a side extending transversely with respect thereto by the rod element 90, which is of thicker form.

That edge of the step 98 which is to be arranged so as to be averted from the housing 18 and which extends in the circumferential direction and which is formed on the rod element 90 is rounded in order to form a first bending formation 100. Likewise, an edge which is to be arranged so as to be averted from the housing 18 and which extends in the radial direction is formed at the tip 96 in order to form a bending formation 102, 104 for the setting process. This applies both to the edge in the region of the step 98 and to the edge on the other side of the tip 96, which thus likewise forms a rounded bending formation 104 for the setting process.

Figure 7:
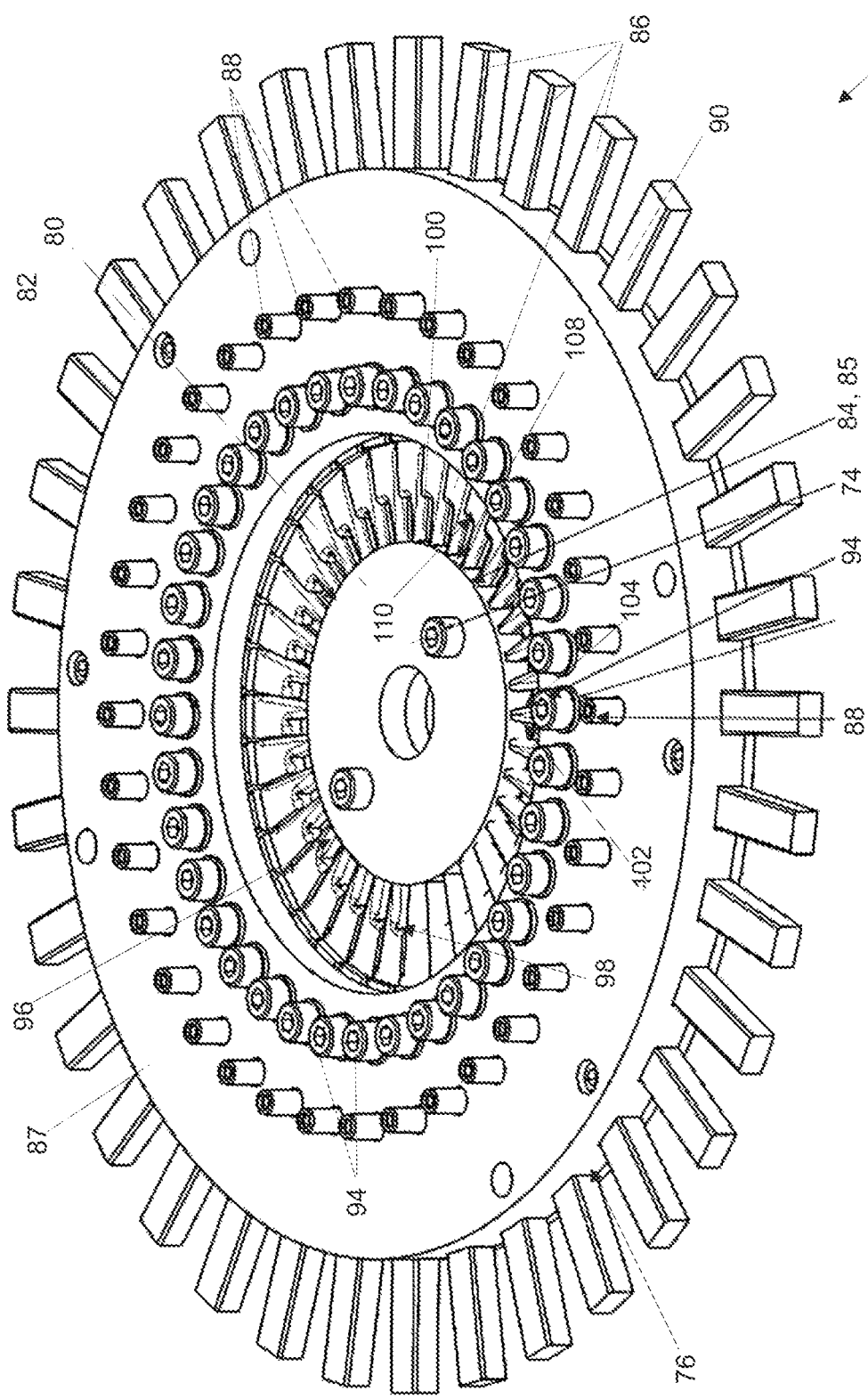
FIG. 7 is a perspective illustration of a first exemplary embodiment of the clamping device.

In the clamping position illustrated in FIGS. 7 and 8, the tips 96 have been introduced into the tip receptacles 85 on the annular flange 82; the steps 98 and the tips 96 form, with the tips 96 of the adjacent clamping fingers 86, receiving grooves 106 for a group of wire ends 34, 34a-34d which protrude together from a housing groove 20. This group of wire ends 34a-34d is clamped between a first clamping region 108 on the first clamping means 74 and a second clamping region 110 on the second clamping means 76 when the clamping fingers 86 are moved radially inward. The first clamping region 108 is formed on the annular flange 82 in each case between the tip receptacles 85. The second clamping region 110 is formed on that region of the step 98 which is delimited by the rod element 90. Those edges which are averted from the housing 18 and which are formed around the respective receiving groove 106 thus act as bending formations 100, 102, 104 for the wire shaping. During the wire shaping, the clamping fingers 86 are supported at one side in the holding ring 87 and at the other side by the receiving of the tips 96 in the tip receptacle 85.

Figure 10:
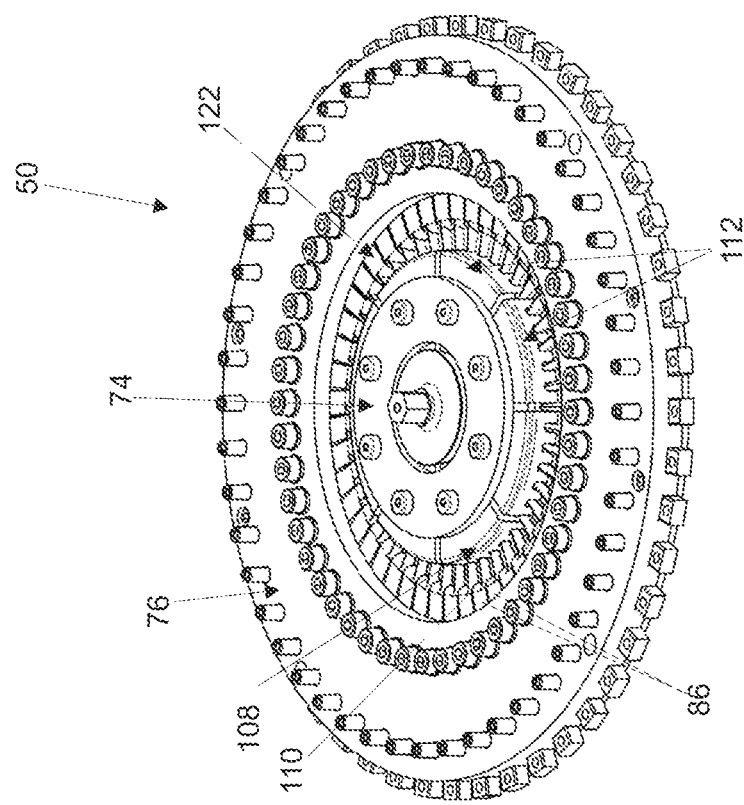
FIG. 10 shows a perspective view of the second exemplary embodiment of the clamping device.
Figure 9:
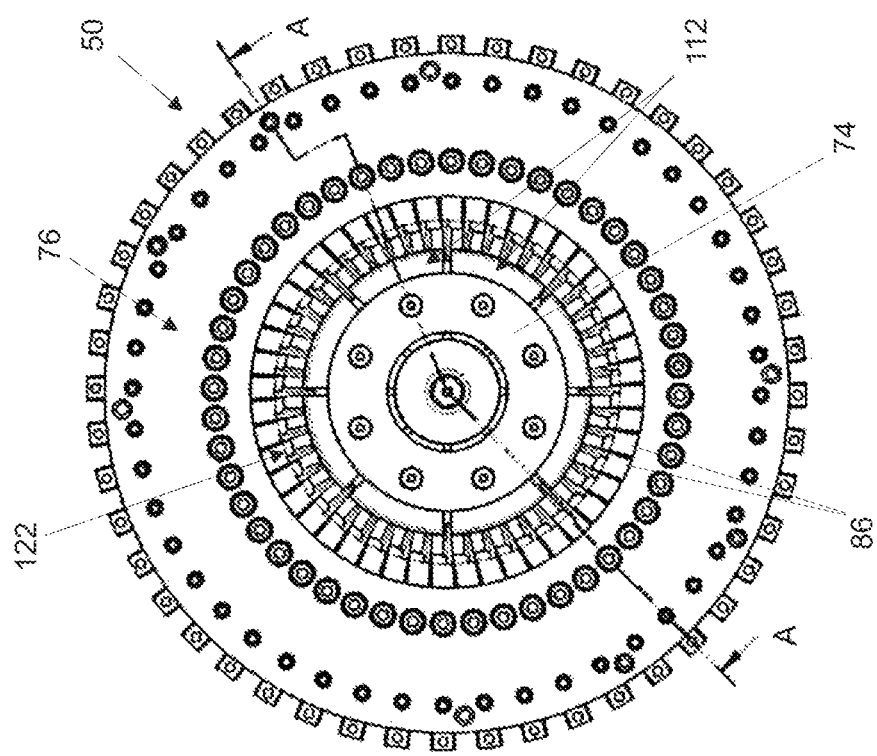
FIG. 9 shows a plan view of a second exemplary embodiment of the clamping device.
Figure 11:
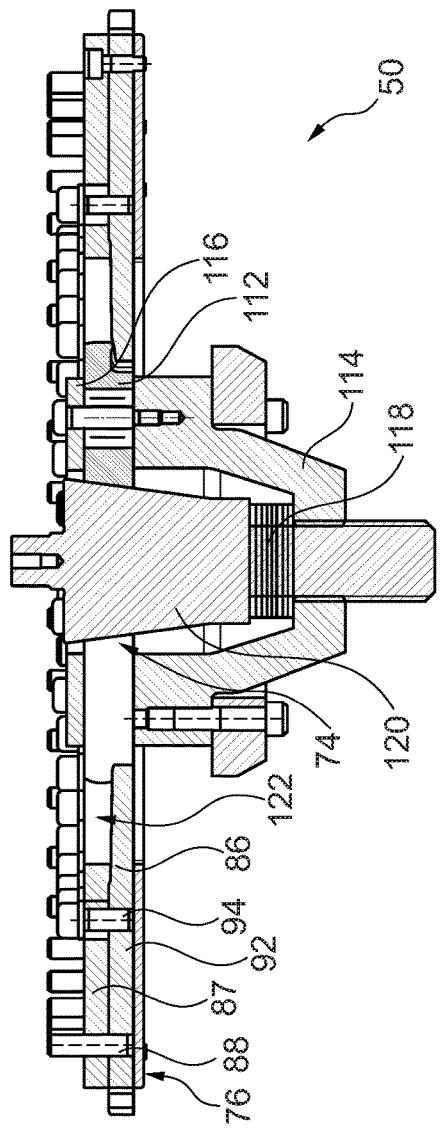
FIG. 11 shows a section through the clamping device according to the second exemplary embodiment along the line A-A in FIG. 9.

The second embodiment of the clamping device 50 will be discussed in more detail below on the basis of FIGS. 9-11. The second embodiment corresponds to the first embodiment aside from the differences presented in more detail below, such that reference may be made to the description above, wherein the same reference designations have also been used for corresponding elements.

The second embodiment may be used, in particular, where little space is available for the insertion and fastening of the first clamping means 74.

For this purpose, instead of the annular disk body 80, an arrangement of several radially movable segments 112 has been provided, which are guided movably in a radial direction between a main body 114 and an annular disk 116 and which can be driven by means of a conical drive element 120, which can be moved axially by means of a drive thread 118. The upper edge, illustrated in FIG. 2, of the housing 18 with the wire ends 34, 34a-d can be introduced into an annular depression 122 which is formed between the radially movable segments 112 and the holding ring 87, wherein, then, the radially movable segments 112 can, by axial displacement of the conical drive element 120, be moved radially outward in order to thus be moved against the inner wall regions 78 of the housing 18, such that the clamping device 50 is thus fixed to said inner wall regions 78.

In both of the embodiments of the clamping devices 50 illustrated here, the wire ends 34a-34d then protrude from each housing groove 20 beyond the clamping device 50, as indicated in FIG. 6, and can be shaped by the respective bending device 52, 54.

An exemplary embodiment of the radial bending device 52 will be discussed in more detail below on the basis of the illustrations in FIGS. 12-14.

Figure 14:
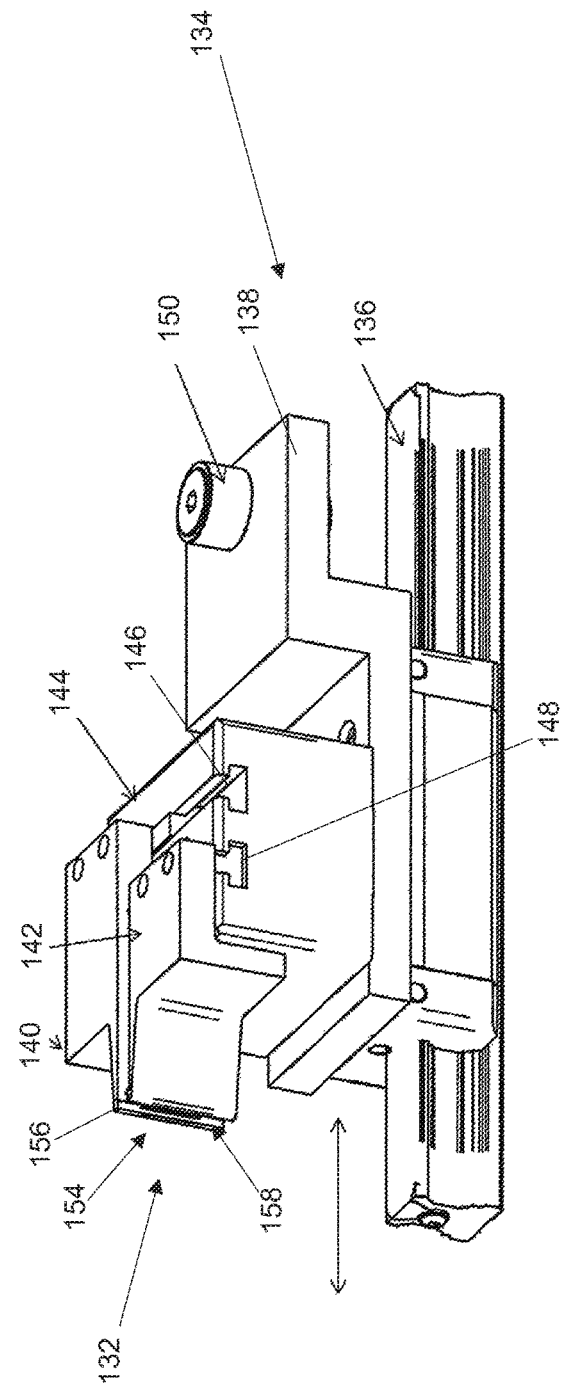
FIG. 14 is a perspective illustration of an exemplary embodiment of a gripper unit with a the radial bending device of FIGS. 12 and 13.
Figure 12:
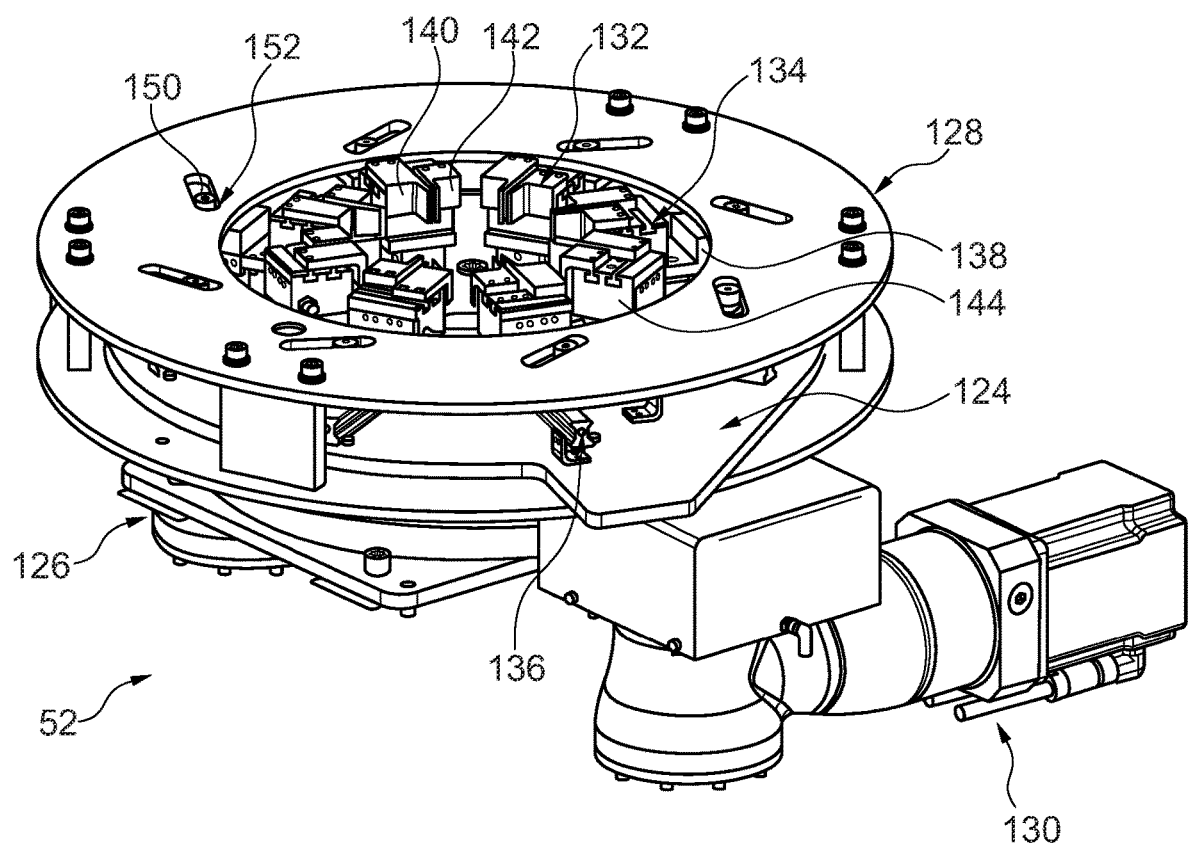
FIG. 12 shows a perspective view of an exemplary embodiment of the radial bending device.
Figure 13:
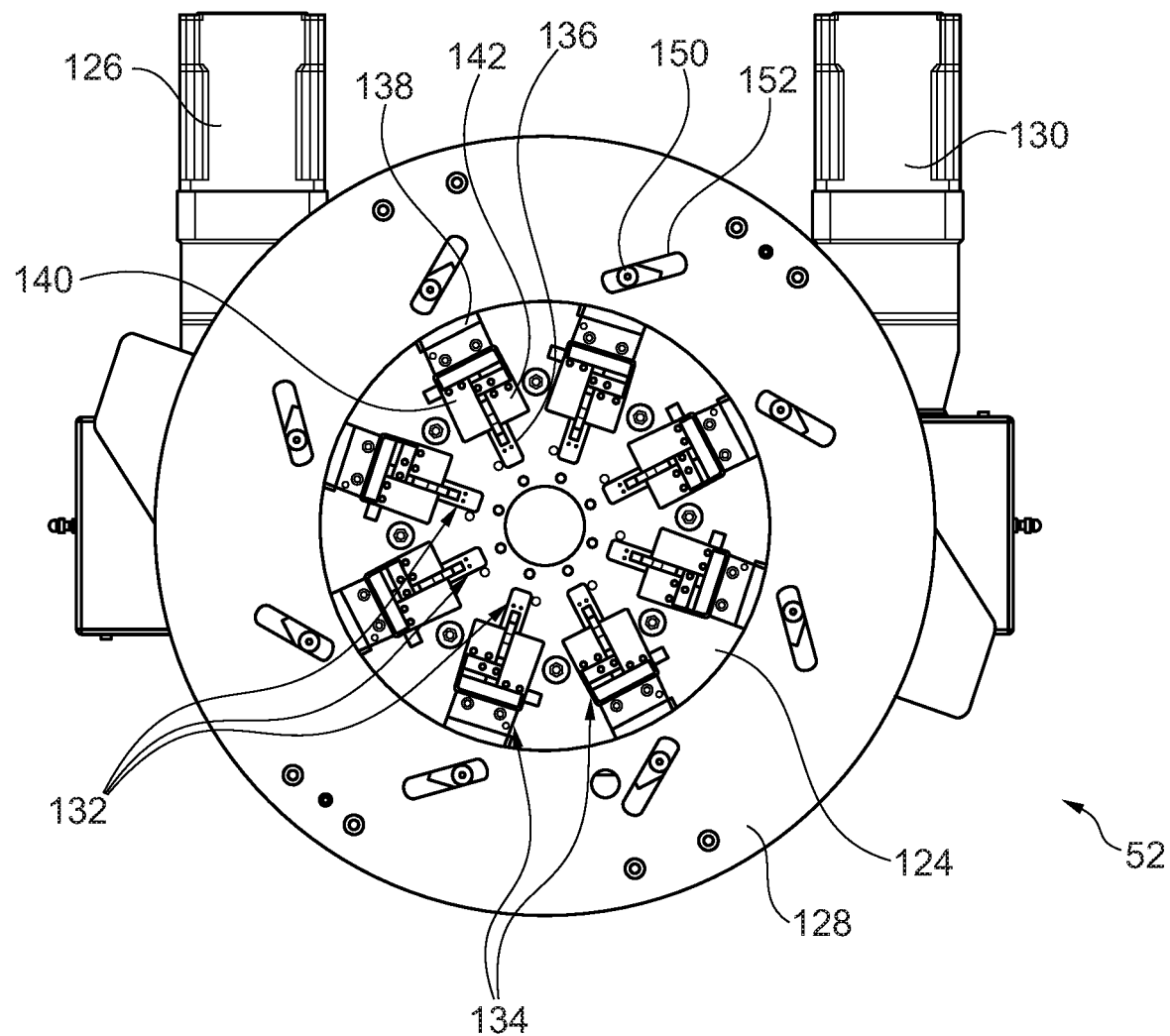
FIG. 13 shows a plan view of the exemplary embodiment of the radial bending device.

The embodiment of the radial bending device 52 illustrated in FIGS. 12-14 has a base plate 124, which is rotatable about an axis of rotation, a base plate drive means 126, which can be activated by the first controller 68 and which serves for driving the rotational movement of the base plate 124, a drive plate 128, which is rotatable relative to the base plate 124 likewise about the axis of rotation, a drive plate drive means 130, which serves for driving the rotational movement of the drive plate 128 and which can be activated by the first controller 68, and a series of grippers 132, which are arranged so as to be distributed over a circumference. In each case one gripper 132 is formed on a gripper unit 134, which is illustrated individually in FIG. 14.

For this purpose, on the base plate 124, there are provided displacement guides, for example in the form of a displacement rail 136, which displacement guides extend in a radial direction. In each case one gripper carriage 138 is guided displaceably on the displacement guide. On the gripper carriage 138, a first gripping jaw 140 and a second gripping jaw 142 are guided so as to be displaceable relative to one another in a tangential direction. For example, a guide block 144 with a first guide groove 146 for guiding the gripping jaw 140 and a second guide groove 148 for guiding the second gripping jaw 142 are formed on the gripper carriage 138. Furthermore, each gripper unit 134 has a jaw drive unit which is not illustrated in any more detail in the drawings. The jaw drive units of all gripping jaws may be driveable synchronously by means of a common drive means which is likewise not illustrated in any more detail. Alternatively, the jaws of all, a group of or individual grippers 132 may be driveable individually, for example by means of electric motors. The jaw drive means or the jaw drive units are likewise activatable by means of the first controller 68.

As also emerges from FIG. 14 and FIGS. 12 and 13, each gripper carriage 138 has a slotted-guide pin 150 which engages into a corresponding slotted guide 152, provided for each gripper 132, in the drive plate 128. In the illustrated exemplary embodiment, the slotted guide 152 is formed in each case by a slot extending obliquely with respect to the radial direction. A relative rotation between drive plate 128 and base plate 124 thus leads, by means of the slotted guide 152 formed as a slot, to a displacement of the gripper carriages 138 and thus of the grippers 132 along the displacement rail 136 in a radial direction. In this way, all grippers 132 are movable jointly in the radial direction.

As can be seen most clearly from FIG. 14, the individual grippers 132 are designed and configured in the form of pincers. For this purpose, on each gripping jaw 140, 142, there is provided in each case one free end 154 which projects inward in a radial direction, wherein, at the tip of the free end 154, there is provided a projection 156 which projects in the direction of the other gripping jaw. Those surfaces of the projections 156 which are directed toward one another form the clamping surfaces 158 for the clamping of the wire ends 34a-34d which are to be bent in each case. For this purpose, the dimensions of the clamping surfaces 158 are selected such that always in each case only one wire end 34a-34d is clamped between the projections 156. In some embodiments, clamping surfaces may be provided between two projections, such that the wire ends can be gripped in frictionally locking fashion at the clamping surfaces and in positively locking fashion at between the projections.

As can be seen from FIG. 6, the first control device 68 furthermore also activates the first relative movement device 56; this is in each case that relative movement device which has been moved by the transport device 60 into a position close to the radial bending device 52.

That part of the wire end shaping method which leads to the flaring of the wire ends (the bending of the wire ends 34a-34d from the position illustrated in FIG. 2 into the position illustrated in FIG. 3) will be discussed in more detail below.

Firstly, the housing 18 passing from the hairpin insertion device 30 is fixed, by means of the wire ends 34 protruding from the housing grooves 20, on the housing holder 64, and the clamping device 50 is fixed to the housing 18 such that the clamping device 50 is arranged between the housing 18 and the radial bending device 52. More specifically, the clamping device 50 is arranged at the end of the housing 18, wherein the wire ends 34a-34d which jointly protrude from a housing groove 20 are clamped, in each case, jointly between one of the clamping fingers 86 and the first clamping means 74. The corresponding receiving groove 106 of the clamping device 50 is, in this case, designed and configured such that the groove insulator 24 which protrudes with its end remains protected.

Then, the housing 18 is, by means of the first relative movement device 56, moved with the downwardly projecting protruding wire ends 34a-34d axially in the direction of the radial bending device 52.

Initially, by corresponding relative adjustment between base plate 124 and drive plate 128, all of the grippers 132 have been moved into the position in which they have been moved furthest to the outside. The wire ends 34, 34a-34d which protrude further downward beyond the clamping device 50 are moved into the space radially within the grippers 132. The base plate 124 is positioned such that each gripper 132 is aligned centrally with respect to a housing groove 20. In the embodiment illustrated, fewer grippers 132 are provided than there are housing grooves 20. For example, 64 housing grooves are provided, but only 8 grippers. Preferably, for the number nGN of housing grooves and the number nGr of grippers 132, the following applies: nGN=M×nGr, where M, nGN and nGr are natural numbers.

Thus, firstly, the wire ends 34a-34d protruding from a subgroup of the housing grooves 20 are radially flared.

For this purpose, the first controller 68 activates the drive plate drive means 130 such that the grippers 132 are displaced, with gripper jaws 140, 142 moved apart from one another, to the height of the first wire ends 34a arranged radially furthest to the outside. Subsequently, the jaw drive means is activated in order to move the gripper jaws 140, 142 toward one another and thus grasp the first wire ends 34a by means of the grippers 132. With the gripper jaws 140 moved together, the drive plate drive means 130 is then driven by the first controller 68 such that the grippers 132 move radially outward along the displacement rail 136 to a predetermined extent in order to thus bend the first wire ends 34a radially outward. Here, the first rounded bending formation 100 gives rise to reproducible bending of the first wire ends 34a. At the same time, the first relative movement device 56 is activated in order to compensate the relative position between housing 18 and radial bending device 52 in accordance with the change, which can be set during the bending process, in the extent of the first wire ends 34 in an axial direction.

Subsequently, the gripping jaws 140, 142 are moved apart, and the grippers 132 are moved, by activation of the drive plate drive means 130, to the radial position of the second wire segments 48b, while, at the start of the bending of the second wire ends 34b, the axial relative position is set to a value specific for the second wire end. The second wire ends 34b are then correspondingly clamped and/or held in positively locking fashion by virtue of the gripping jaws 140 being moved together, and are bent outward to a determined, smaller extent than the first wire ends 34a by virtue of the grippers 132 being moved radially outward. Here, too, it is in turn the case that the axial relative position is readjusted in accordance with the change in the axial extent of the second wire ends 34b.

This process is then repeated for the third wire end 34c. In one embodiment, the fourth wire end 34d remains in the original position. In another embodiment, the fourth wire end 34d is also bent outward to a small extent in order to also ensure positioning of the fourth wire end in a narrow tolerance range. Bending inward, at least of some wire ends, for example of the innermost wire ends 34d, is however basically also possible.

Subsequently, the grippers 132 move back into the radially outermost position, and the base plate drive means 126 is subsequently driven by the first controller 68 in order to rotate the base plate 124 to a certain extent until the grippers 132 have been set to the center of the next adjacent housing groove 20. Here, the process of the flaring is then repeated again starting from the first, radially outermost wire end 34a to the third wire end 34c or possibly to the fourth wire end 34d.

In the embodiment illustrated here, where the number nGr of grippers 132 is one eighth of the number nGN of housing grooves 20, the flaring process is ended after an eightfold adjustment of the base plate 124.

In other embodiments, not four but some other number of wire ends 34a-34d is provided per housing groove 20. In these embodiments, too, the flaring is performed analogously to the example discussed on the basis of the example with four wire ends 34a-34d per housing groove 20.

Possible embodiments of the circumferential bending device 54 will be discussed in more detail on the basis of the illustrations in FIGS. 15-36.

Figure 15:
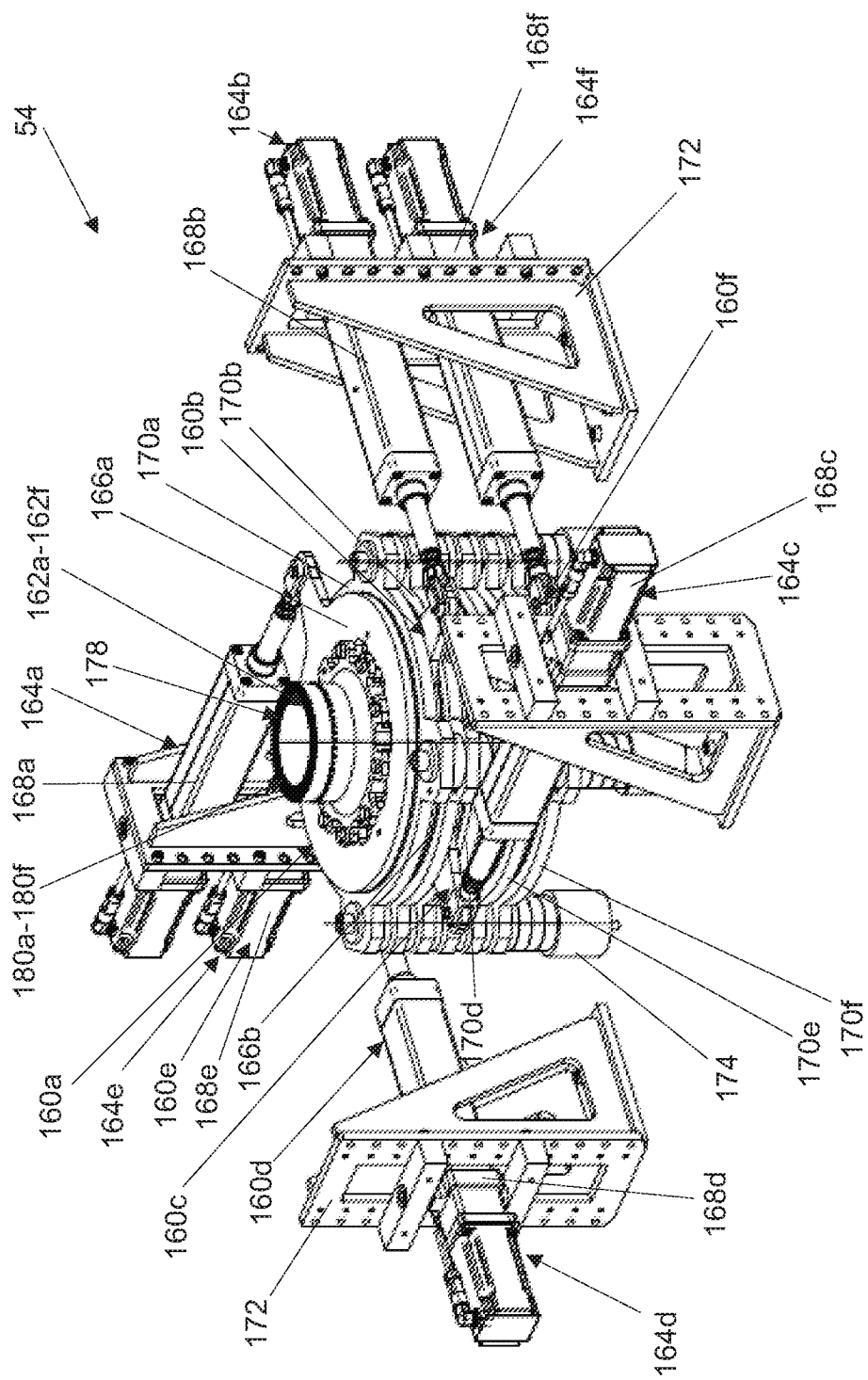
FIG. 15 is a perspective illustration of an exemplary embodiment of the circumferential bending device.
Figure 16:
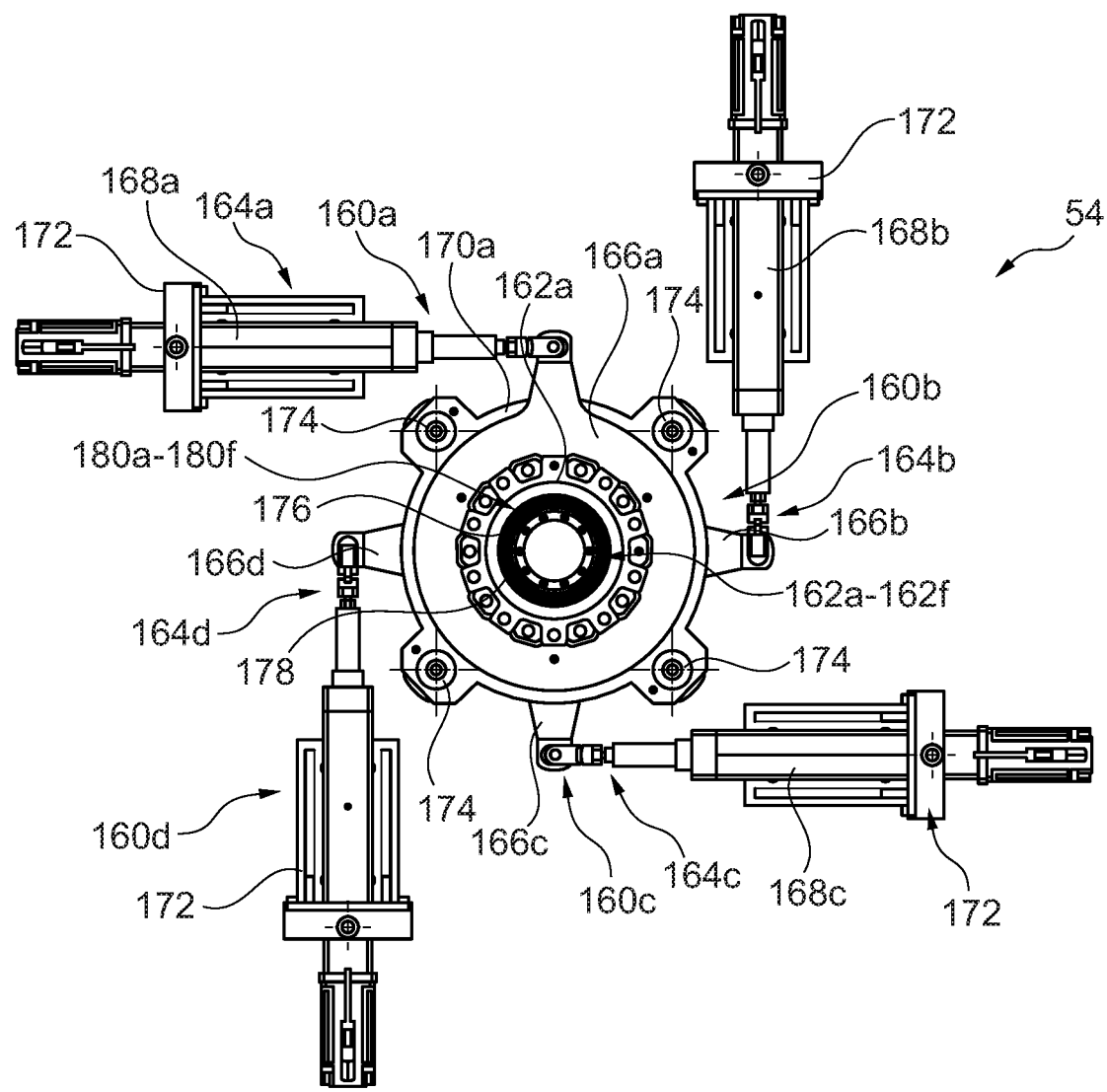
FIG. 16 shows a plan view of the circumferential bending device of FIG. 15.

Here, FIGS. 15 and 16 illustrate an overview of an embodiment of the circumferential bending device 54. This embodiment has a first to sixth receiving and rotating means 160a-160f. Each receiving and rotating means 160a-160f has, in each case, one receiving and rotating unit 162a-162f, for receiving a group of wire ends 34a or 34b or 34c or 34d with equal radial spacing to the housing center and for turning these wire ends 34a-34b, 34c or 34d for the purposes of bending in a circumferential direction, and one drive means 164a-164f for driving a rotational movement of the receiving and rotating unit 162a-162f.

Each drive means 164a-164f has an annular drive element 166a-166f, which is mounted so as to be rotatable about the common axis of rotation, and an actuator 168a-168f for driving the drive element 166a-166f in rotation. In the exemplary embodiment illustrated, the drive elements 166a-166f are designed and configured as annular disk elements with an arm, wherein the actuators 168a-168f are designed and configured as linear drives, for example in the form of electric spindle drives.

Furthermore, each drive element 166a-166f is rotatably mounted on an annular support disk 170a-170f fastened in a static manner. The actuators 168a-168f are mounted on machine frames 172 so as to be static relative to the annular support disks 170a-170f. The annular support disks 170a-170f are fastened jointly to fastening columns 174. Thus, the drive elements 166a-166f, and the receiving and rotating units 162a-162f fastened thereto in a manner to be discussed in more detail below, are duly also rotatable relative to one another about a common axis of rotation, but are held so as to be static relative to one another in an axial direction. Only a rotary drive (first to sixth drive means 164a-164f), but no separate axial drive, is necessary.

Figure 26:
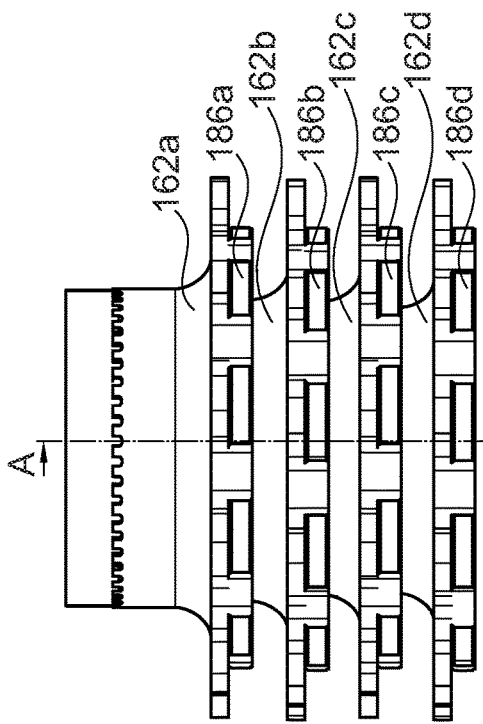
FIG. 26 shows a side view of the combination of FIG. 25.
Figure 27:
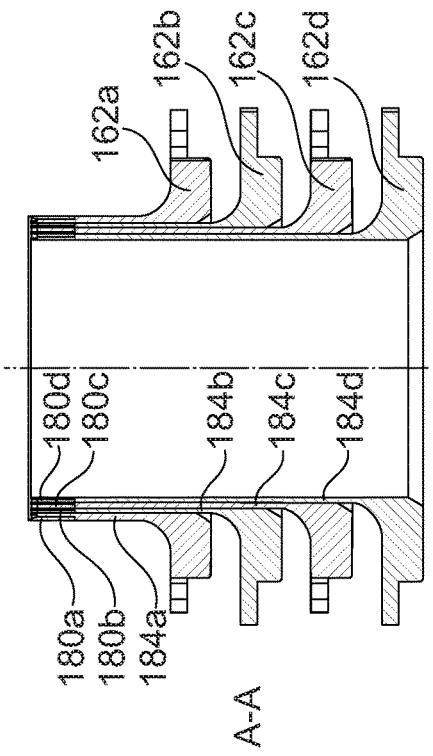
FIG. 27 shows a section through the combination along the line A-A of FIG. 26.
Figure 25:
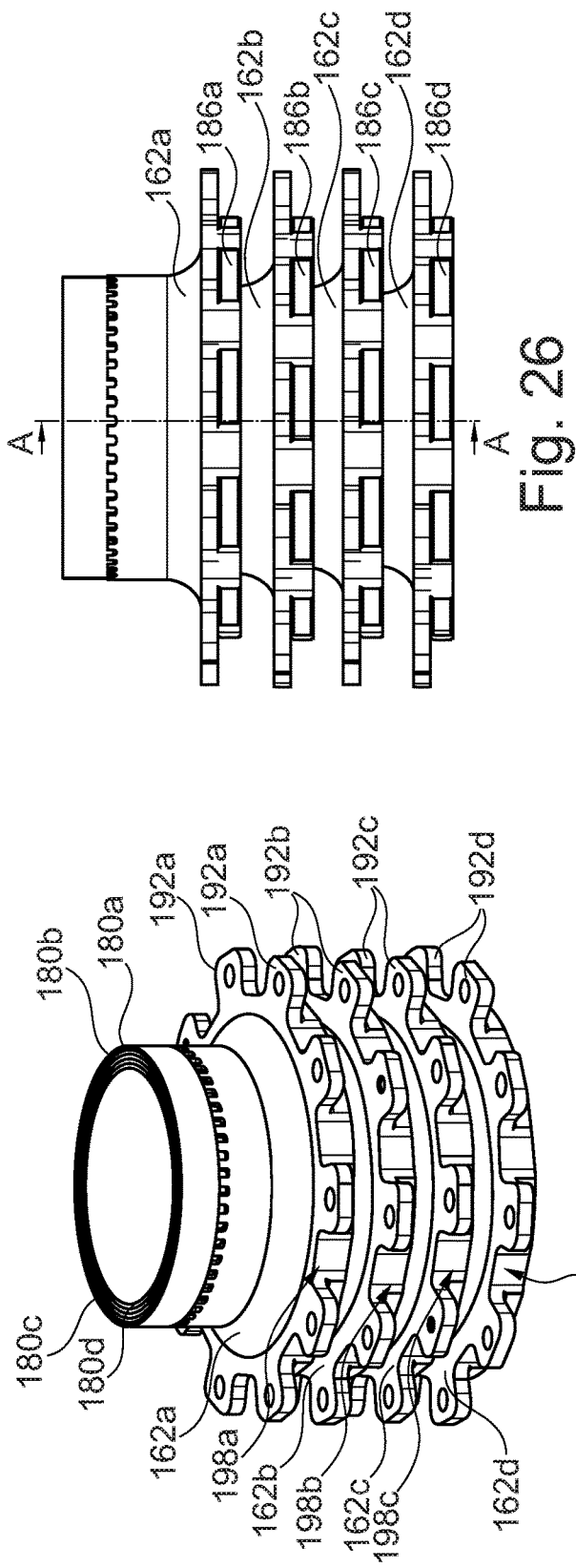
FIG. 25 is a perspective illustration of a combination of the first receiving and rotating unit, a second receiving and rotating unit, a third receiving and rotating unit and the fourth receiving and rotating unit nested one inside the other.

FIGS. 20 to 24 show the first receiving and rotating unit 162a in different illustrations. FIG. 19 is a perspective illustration of the fourth receiving and rotating means 162d, and FIGS. 25 to 27 show a combination of the first to fourth receiving and rotating units 162a-162d stacked one inside the other. As can be seen from these illustrations, each receiving and rotating unit 162a-162f has an annular arrangement of upwardly open receiving holes 176 which extend downward in an axial direction and which serves for receiving wire ends. The annular arrangement of receiving holes 176 is formed on setting crowns 180a-180f which are arranged so as to lie around one another with different diameters at the same axial height, and which all end upwardly at the same axial height. Here, the first receiving and rotating unit 162a has an annular arrangement of receiving holes 176 with the largest diameter. This is followed, as viewed in the inward direction, by the annular arrangement of the second receiving and rotating unit 162b, then the annular arrangement of the third receiving and rotating unit 162c etc., as far as the sixth receiving and rotating unit 162f, the annular arrangement of which is arranged furthest to the inside.

Thus, the first receiving and rotating unit 162a is designed and configured for receiving the first wire ends 34a arranged radially furthest to the outside, wherein all first wire ends 34a of all housing grooves 20 can be grasped and can be bent in the circumferential direction by rotation of the first receiving and rotating unit 162a. The second receiving and rotating unit 162b is designed and configured for receiving all second wire ends 34b which protrude from all housing grooves 20. For the wire end shaping process, the second receiving and rotating unit 162b is turned in the opposite direction to the first receiving and rotating unit 162a until such time as the first wire ends 34a from one of the next housing grooves 20 come to lie at the same circumferential position as some of the second wire ends 34b, such that pairs of wire ends 34a, 34b which are to be connected to one another come to lie adjacent to one another. The third receiving and rotating unit 162c serves for receiving and bending the third wire ends 34c in the circumferential direction, and the fourth receiving and rotating unit 162d serves for receiving and bending the fourth wire ends 34d.

The circumferential bending device 54 illustrated here also has a fifth and a sixth receiving and rotating unit 162e and 162f, such that fifth and sixth wire ends could also be bent. To produce the stator of which a precursor is illustrated in FIGS. 2 and 3, where four wire ends 34a-34d protrude from each housing groove 20, the first to fourth receiving and rotating means 160a-160d are sufficient, such that the fifth and sixth receiving and rotating means 160e, 160f could also be omitted. In the case of a correspondingly smaller or greater number of wire ends, the number of receiving and rotating means would need to be correspondingly adapted.

The bending of the wire ends 34a-34d in the circumferential direction is performed, in each case, with opposite directions of rotation for the wire ends 34a/34b, 34b/34c, 34c/34d which are arranged adjacent to one another in a housing groove 20, specifically to such an extent that, with an adjacent wire end from one of the next housing grooves 20, in each case one pair for connection can be produced such that multiple continuous coil windings are realized. Here, the, in each case, outer wire ends 34a must, owing to the greater circumference at the outer side, be bent over a greater distance than the wire ends 34d arranged, in each case, right at the inside.

Therefore, the hairpins 12 are preferably already produced and/or inserted into the housing 18 such that, as illustrated in FIG. 2 and FIG. 3, the first wire ends 34a protrude with a greater length than the second wire ends 34b, the second wire ends 34b protrude with a greater length than the third wire ends 34c, and the third wire ends 34c in turn protrude with a greater length than the fourth wire ends 34d. The differences in the lengths are dependent, in each case, on the differences in the distance to be covered in the circumferential direction.

During the bending of the wire ends 34a-34d by rotation of the corresponding receiving and rotating unit 162a-162d, the respective axial extent of the wire end 34a-34d, which is bent progressively further, shortens owing to the bending process.

Therefore, during the setting process in the circumferential wire end shaping device 38, the second relative movement device 58 is correspondingly readjusted in order to compensate the length compensation. The corresponding activation is performed by means of the second controller 70, which both activates all drive means 164a-164f, and thus, via the actuators 168a-168f, the drive elements 166a-166f, and also activates the second relative movement device 58.

Here, there are different resulting movement profiles K1, K2, K3, K4 for the wire ends 34a-34d of different length and the different distances of the bending in the circumferential direction for the respective wire ends 34a-34d with different radial spacing to the housing central axis.

Instead of now providing a separate movement in an axial direction for each receiving and rotating means 160a-160f for the different length compensation, the rotational movement of the individual receiving and rotating units 162a-162f is controlled differently such that, in a manner dependent on the relative movement between housing 18 and circumferential bending device 54, and in a manner dependent on the axial change in length resulting from the bending of the respective wire ends 34a-34d in the circumferential direction, the rotational movement of each receiving and rotating unit 162a-162f is individually activated such that, in the receiving holes 176, there is no resulting relative movement between the respective end region of the wire end 34a-34d and the receiving hole 176.

Figure 17:
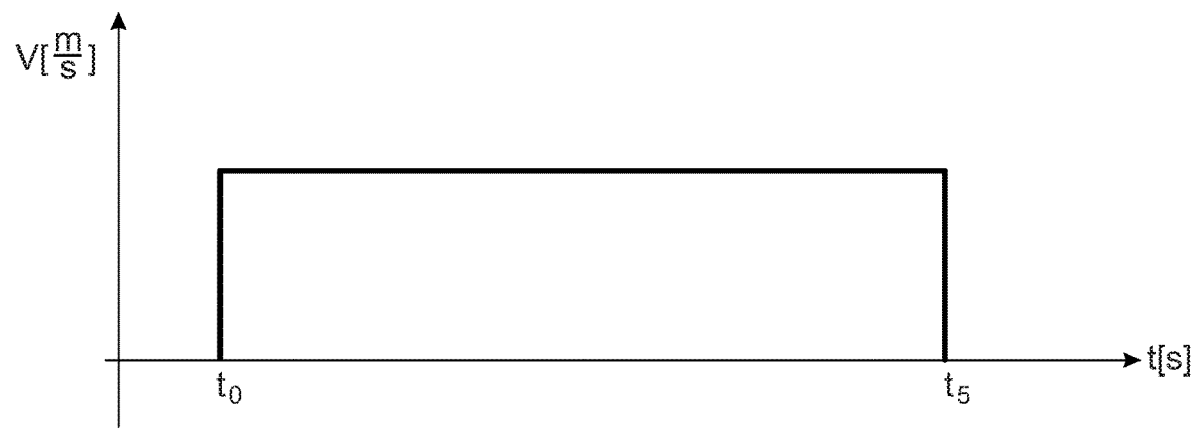
FIG. 17 shows a diagram in which the relative speed between a housing and the circumferential bending device is plotted schematically versus the time.
Figure 18:
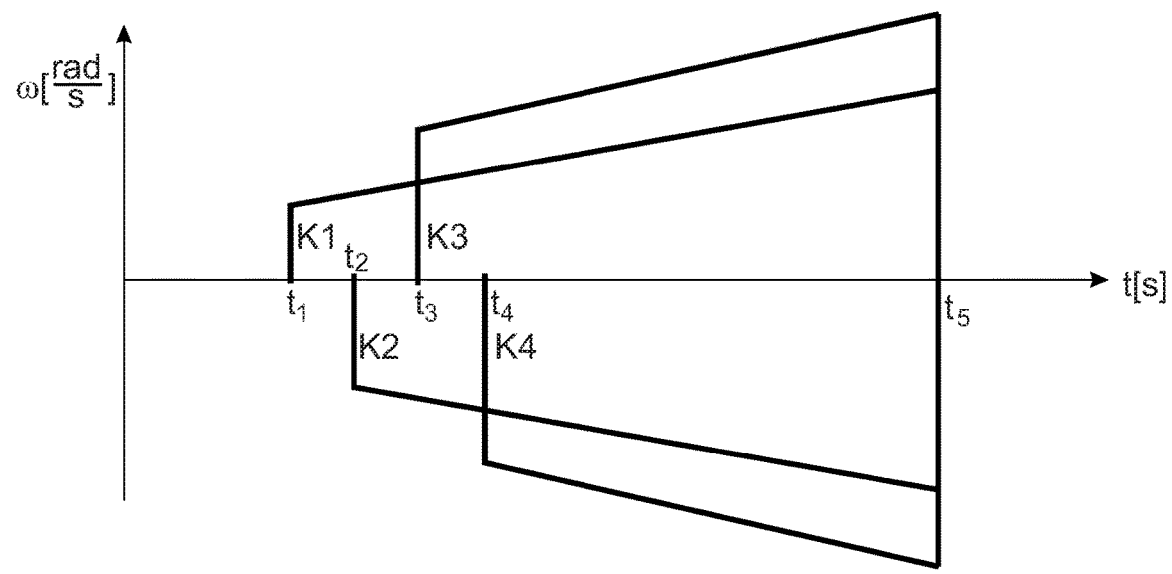
FIG. 18 shows a diagram, recorded at the same time as FIG. 17, in which rotational speeds of a first to fourth receiving and rotating unit of the circumferential bending device are illustrated schematically in simplified form.
Figure 24:
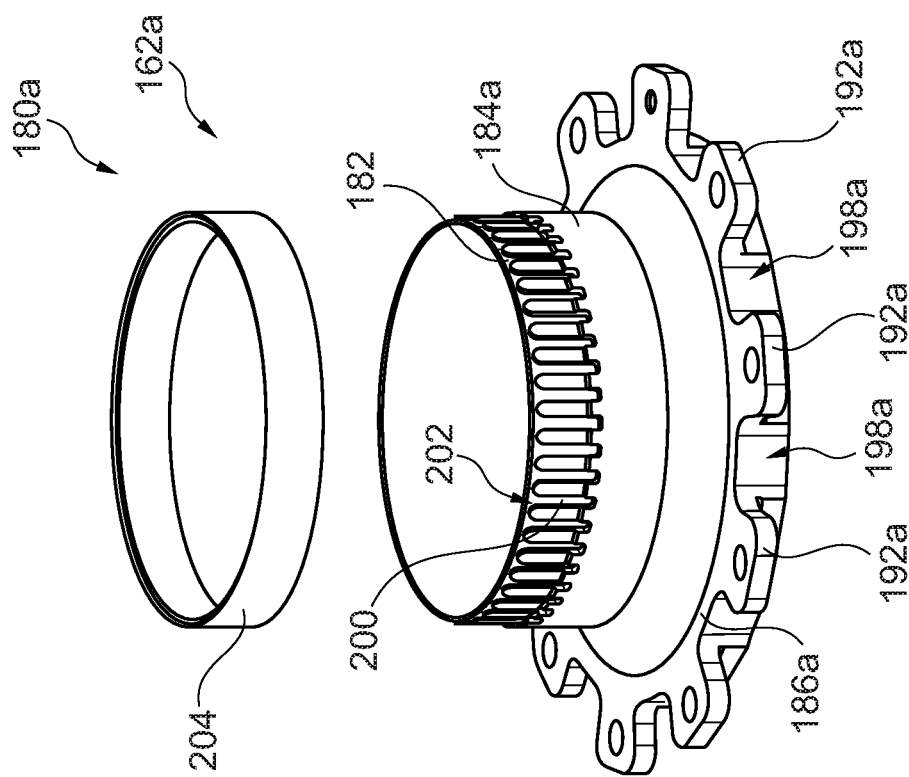
FIG. 24 is a perspective exploded illustration of the first receiving and rotating unit.
Figure 23:
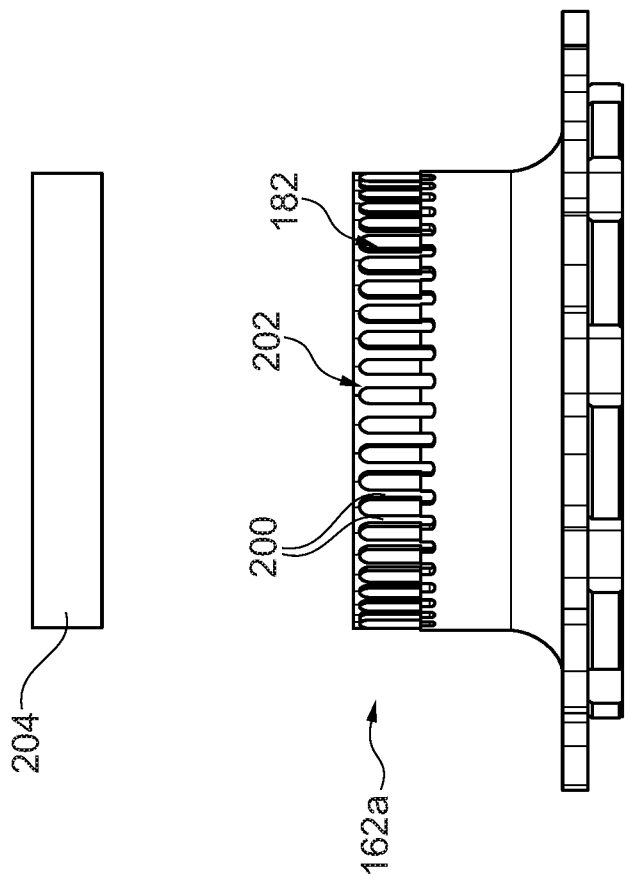
FIG. 23 is an exploded illustration, in a side view, of the first receiving and rotating unit, wherein a main element and a ring element are illustrated in a state in which they are away from one another.

Greatly simplified examples for corresponding movement profiles K1-K4 are illustrated in FIGS. 17 and 18. Here, FIG. 17 shows the movement profile of the second relative movement device 58, more specifically the relative speed v between the housing 18 and the circumferential bending device 54. FIG. 18 shows, at the same time, the rotational speeds ω for the first to fourth receiving and rotating unit 162a-162d.

As can be seen from FIG. 17, it is preferably the case here that the housing 18 is moved with a uniform speed v toward the circumferential bending device 54.

The first wire ends 34a are, after the previously discussed flaring process, situated at the radial height of the annular arrangement of receiving holes 176 of the first receiving and rotating unit 162a, and are, shortly before the time t1, moved with their end regions to a certain extent into the receiving holes 176. Here, the time t1 is selected such that an adequately long end region of the first wire ends 34a has been moved into the receiving holes 176 of the first receiving and rotating unit 162a. This is followed, as illustrated in the curve K1, by the start of a rotational movement of the first receiving and rotating unit 162a in the first direction of rotation (positive axis of FIG. 18). The rotational speed ω is in this case not uniform but rather varies correspondingly to the requirement arising from the uniform speed of the housing 18 toward the circumferential bending device 54 and from the axial change in length of the first wire ends 34a that results during the rotation. The curve K1 is depicted here in simplified form as linearly rising. The actual course of the movement is somewhat more complex, but can be easily ascertained by means of simple tests, or mathematically. The target criterion here is that the end regions do not move in an axial direction within the receiving holes.

Shortly before the time t2, the end regions of the second wire ends 34b move into the receiving holes 176 of the second receiving and rotating unit 162b until, at the time t2, said end regions have been moved in to a sufficient extent. At this time t2, the rotation of the second receiving and rotating unit 162b in the opposite direction of rotation to the rotation of the first receiving and rotating unit 162a (negative region in FIG. 18) begins. The corresponding rotation of the second receiving and rotating unit 162b is likewise depicted in simplified form as linearly rising by the curve K2. Here, too, the actual course of the movement is more complex. The curves K3 and K4, with their start points t3 and t4, show the respective corresponding movement profile for the third receiving and rotating unit 162c and the fourth receiving and rotating unit 162d, respectively. Here, if a stator with six wire ends per housing groove 20 is processed, corresponding curves would also be depicted for the fifth and sixth receiving and rotating units 162e, 162f.

It is clear from FIGS. 17 and 18 that the different receiving and rotating units 162a-162f are driven with different movement profiles in order, with a simple mechanical construction without separate axial drives, to effect the length compensation during the shaping of the wire ends 34a-34d in the circumferential direction, such that as far as possible, no relative movement of the end regions of the wire ends 34a-34d in the respective wire end receptacle 182 formed by the receiving holes 176 occurs.

During the bending of the wire ends 34a-34d in the circumferential direction by means of the circumferential bending device 54, as discussed above, the clamping device 50 is furthermore arranged between the housing 18 and the bending device 54. The second rounded bending formation 102 on the clamping fingers 86 acts here as a bending formation for those wire ends 34a-34c which are to be bent in one direction of rotation, and the third rounded bending formation 104 on the clamping fingers 86 acts here as a bending formation for those wire ends 34b, 34d which are to be shaped in the other direction of rotation. Owing to the clamping device 50, the position of the wire ends 34a-34d is also maintained in a defined manner during the shaping of the wire ends 34a-34d in the circumferential direction. The shaping is performed in a highly reproducible manner. Furthermore, the groove insulators 24 are protected.

After the completion of the wire end shaping process (setting), the clamping device 50 is removed again, for which purpose, firstly, the clamping fingers 86 are moved radially outward and thus moved out of the intermediate spaces between the wire ends 34a-34d; subsequently, the clamping device 50 can be released from the housing 18, and removed from the housing 18 in an axial direction.

The housing with the shaped wire ends 34a-34d is then transported onward to the next station in the component production device 10, for example to a preloading and/or fixing device 40, where the pairs of wire ends are captured and/or braced together for the purposes of carrying out cutting and welding processes.

As discussed above, for the shaping of the wire ends 34a-34d, the end regions thereof are pushed axially into an annular arrangement of receiving holes 176 and then set by turning of the annular arrangement.

The receiving holes 176 are preferably formed on so-called setting crowns 180a-180f which, in the case of automated mass production of stators, are correspondingly highly loaded and should therefore be serviced and/or exchanged from time to time.

The particular configuration of preferred exemplary embodiments for the circumferential bending device 54, which permit easy exchange and/or easy assembly and disassembly of the receiving and rotating units 162a-162f, will be discussed below on the basis of the illustrations in FIGS. 19 to 33.

FIG. 19 shows an example for the fourth receiving and rotating unit 162d, and FIGS. 20 to 24 show an example for the first receiving and rotating unit 162a. As can be seen from FIGS. 19 to 24, the receiving and rotating units 162a-162f have the setting crowns 180a-180f, on which are formed the annular arrangement of receiving holes 176, which act as wire end receptacles 182. The setting crowns 180a-180f are provided at one end of a cylinder-shell-shaped region 184a-184f, at the other end of which there is formed an annular disk flange 186a-186f, by means of which the receiving and rotating unit 162a is connected by means of a releasable connection 188a-188f to the respective drive element 166a-166f formed as a drive ring.

FIGS. 25 to 27 illustrate a combination of the first to fourth receiving and rotating units 162a-162d nested one inside the other, whereas FIGS. 28-33 show a combination of the first to sixth receiving and rotating means 160a-160f in different positions.

Here, the first to sixth drive elements 166a-166f are arranged one above the other, wherein the first drive element 166a is arranged at the very top, and the sixth drive element 166f is arranged at the very bottom, and the remaining drive elements 166b-166e are arranged in a distributed manner in between. Correspondingly, the cylinder-shell-shaped regions 184a-184f have different extents in an axial direction, wherein the first cylinder-shell-shaped region 184a is that region with the shortest axial extent, and the sixth cylinder-shell-shaped region 184f is that which has the longest axial extent. The sixth cylinder-shell-shaped region has the smallest outer circumference, which is dimensioned so as to just fit into the inner circumference of the fifth cylinder-shell-shaped region 184e. The fourth cylinder-shell-shaped region 184d is arranged around this; the first cylinder-shell-shaped region 184a is arranged at the very outside; the remaining cylinder-shell-shaped regions 184c are arranged in between.

As can be seen most clearly from FIGS. 28 to 33, each of the first to sixth releasable connections 188a-188f has a series of connecting bridges 190a-190f arranged so as to be distributed over the circumference. Each connecting bridge 190a-190f extends radially and has, in each case, one output-side bridge element 192a-192f on the receiving and rotating unit 162a-162f, a drive-side bridge element 194a-194f on the drive element 166a-166f, and a connecting element 196a-196f for the releasable connection of the bridge elements 192a-f, 194a-f.

As can be seen most clearly from FIGS. 19 to 24, the output-side bridge elements 192a-192f are formed as radially extending projections which are distributed over the circumference of the annular flange 186a-186f and which are in the form of screw-attachment flanges with bores which extend in an axial direction over one half of the axial of the annular flange 186a-186f.

The drive-side elements 194a-194f are formed as projections which protrude inwardly at the inner circumference of the annular drive elements 196a-196f and which are in the form of screw-attachment flanges with threaded bores, the axial height of which corresponds to the second half of the axial extent of the annular flange 186a-186f. The connecting elements 196a-196f are formed predominantly by threaded screws, which can be screwed with the threaded shank thereof into the threaded bores of the drive-side bridge elements 194a-194f, wherein the screw heads of said threaded screws bear against the rims of the bores of the output-side bridge elements 192a and can be engaged from above by means of a tool engagement portion. One of the connecting elements, for example that which is in the region of an arm, is designed and configured differently, for example is formed by a projection on one of the bridge elements 192a-f, 194a-f and a complementary set-back portion on the other of the bridge elements, in order to thus ensure a predetermined relative position.

As shown by a comparison of FIGS. 19 to 24 and the illustrations in FIGS. 25 to 27, the output-side bridge elements 192a-192f which are distributed over the circumference of the annular flange 196a-196f form a toothed structure, the toothed pitch of which is the same on the first to sixth receiving and rotating units 162a-162f. Between the connecting bridges 190a-190f, there are formed passages 198a-198f, the clear width of which in a circumferential direction is dimensioned to be greater than the maximum extent of the bridge elements 192a-f, 194a-f in the circumferential direction. It is thus possible, if the receiving and rotating unit 162a-f, on the one hand, and drive element 166a-166f, on the other hand, have been correspondingly turned relative to one another, for the bridge elements 192a-192f, 194a-f to be guided past one another in the axial direction.

As can be seen from FIGS. 19 to 24, the setting crowns 180a-180f are each formed by virtue of the axially extending longitudinal grooves 200 being milled in at the end of the cylinder-shell-shaped region 184a-184f, wherein said longitudinal grooves 200 have insertion bevels 202 at their free ends. The number of longitudinal grooves 200 corresponds to the number nGN of housing grooves 20. A setting crown ring 204 is pushed onto this arrangement of longitudinal grooves 200 distributed over the circumference, such that the receiving holes 176 are delimited at three sides by the longitudinal groove edges and at the radially outer side by the setting crown ring 204.

To exchange these setting crowns 180a-180f, a disassembly and assembly method is performed which will be discussed in more detail below on the basis of the illustrations in FIGS. 28 to 33.

Figure 28:
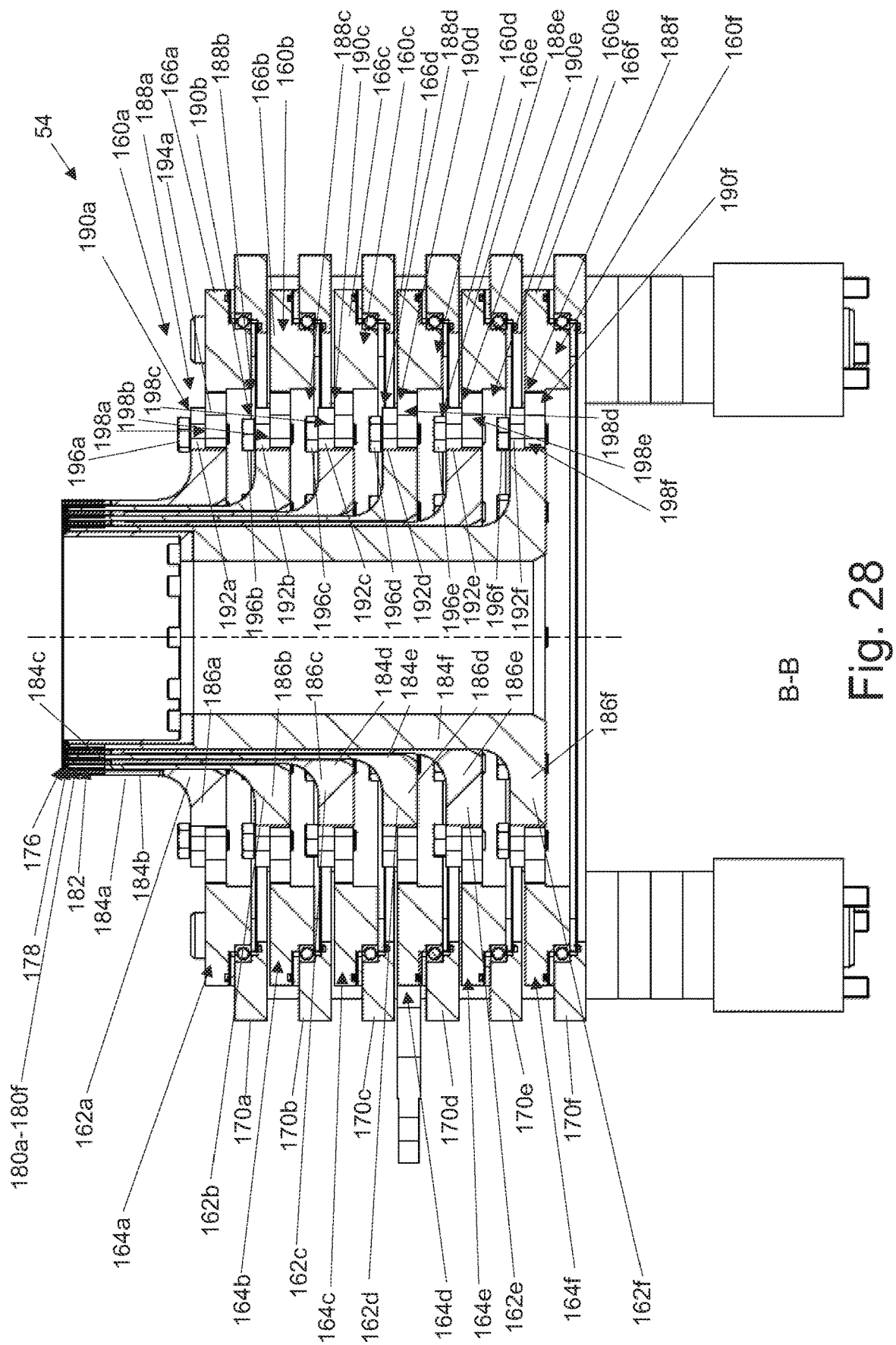
FIG. 28 shows a section through a combination of a first to sixth receiving and rotating means of the circumferential bending device of FIGS. 15 and 16, wherein each receiving and rotating means has a receiving and rotating unit and a drive element extending in a circumferential direction, in an operational position, with a section along the line B-B in FIG. 29 being illustrated.
Figure 29:
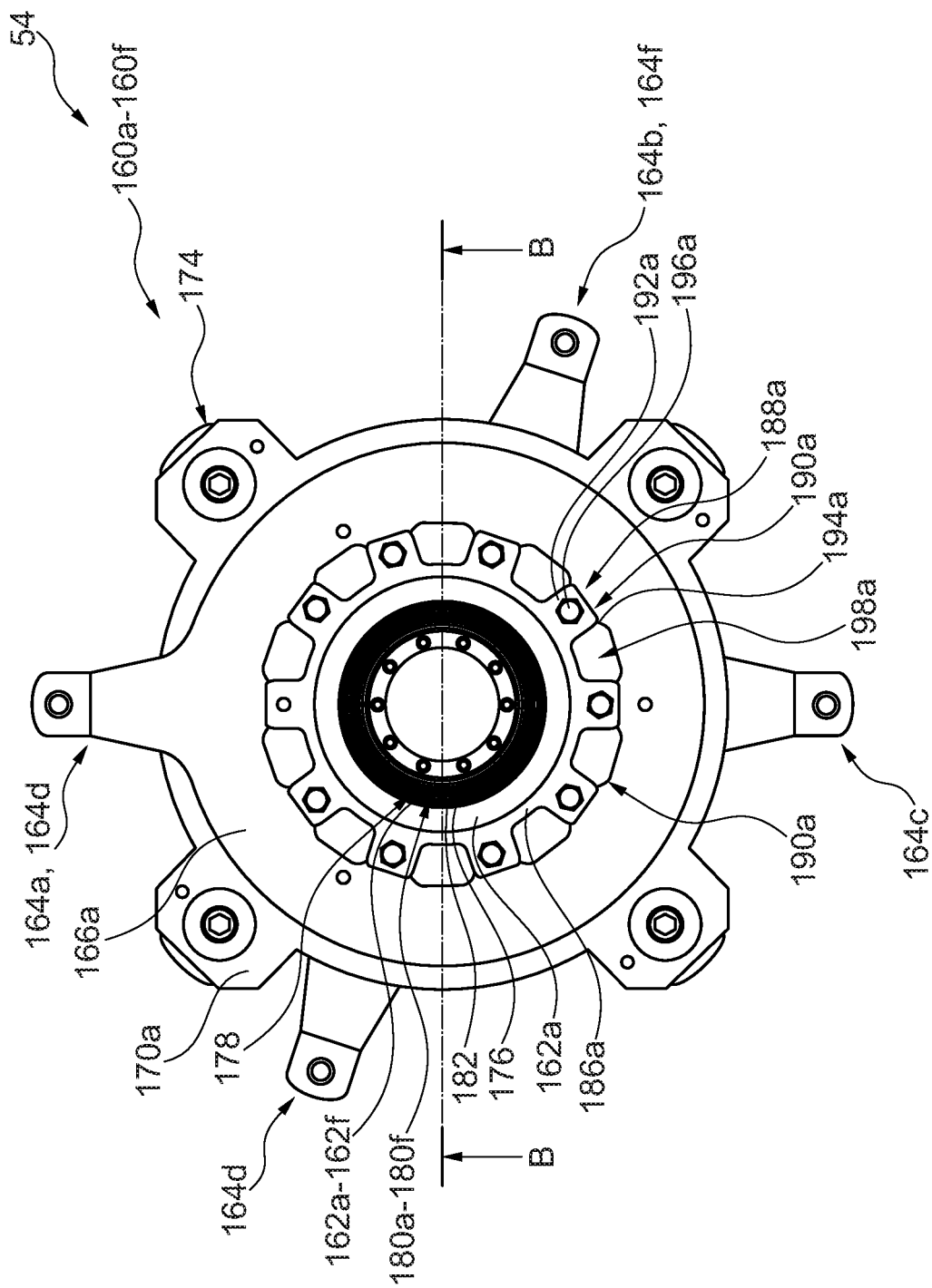
FIG. 29 shows a plan view of the combination of FIG. 28.
Figure 30:
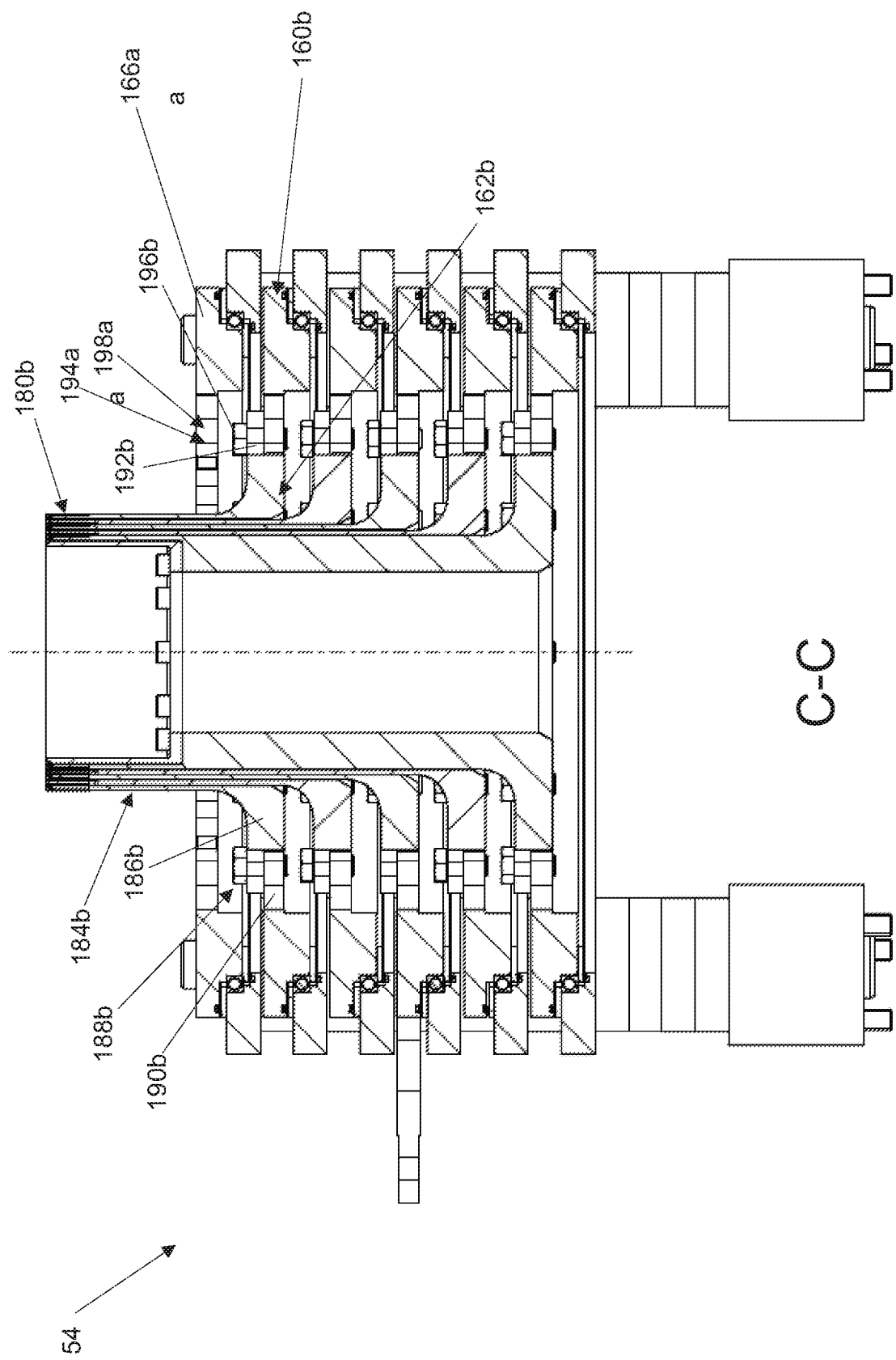
FIG. 30 shows the combination similarly to FIGS. 28 and 29, wherein a first receiving and rotating unit has been removed, in section along the line C-C in FIG. 31.
Figure 31:
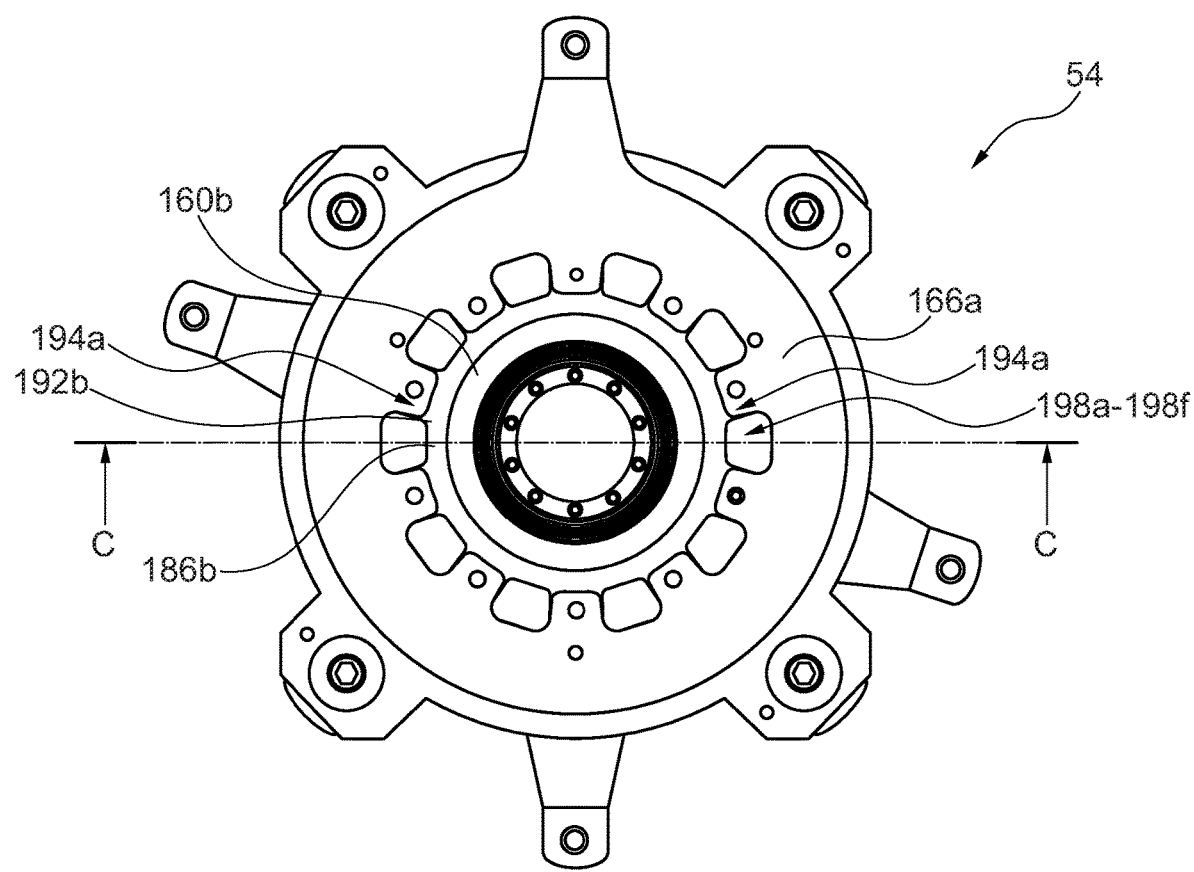
FIG. 31 shows a plan view of the combination, with the first receiving and rotating unit having been removed, of FIG. 30.

Here, FIGS. 28 and 29 show an initial position and an operational position of the circumferential bending device 54. Here, the first connecting elements 196a are firstly released. This can be performed easily by engagement of a tool on the screw heads. Subsequently, the first receiving and rotating unit 162a can be removed in an upward direction, which leads to the situation illustrated in FIGS. 30 and 31. As can be seen from FIG. 31, all of the bridge elements 192a-192f, 194a-194f are in this case aligned relative to one another.

The second controller 70 includes a disassembly mode and assembly mode, by means of which the individual drive elements 166a-166f are individually movable for movement into a respective disassembly position.

Figure 32:
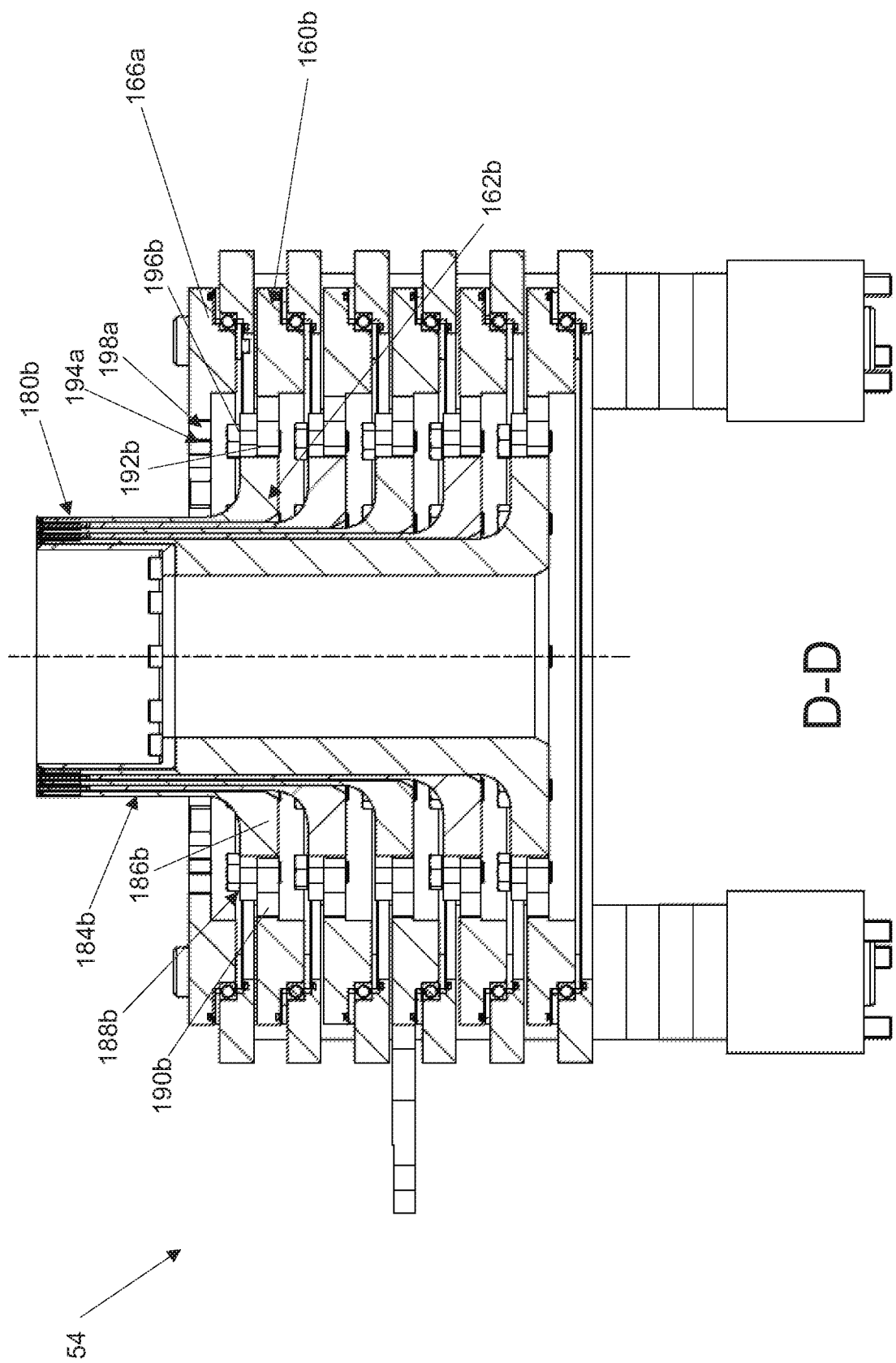
FIG. 32 shows the combination of FIGS. 30 and 31 with the first receiving and rotating unit having been removed, but in an assembly and disassembly position for the assembly or disassembly of the second receiving and rotating unit, in section along the line D-D in FIG. 33.
Figure 33:
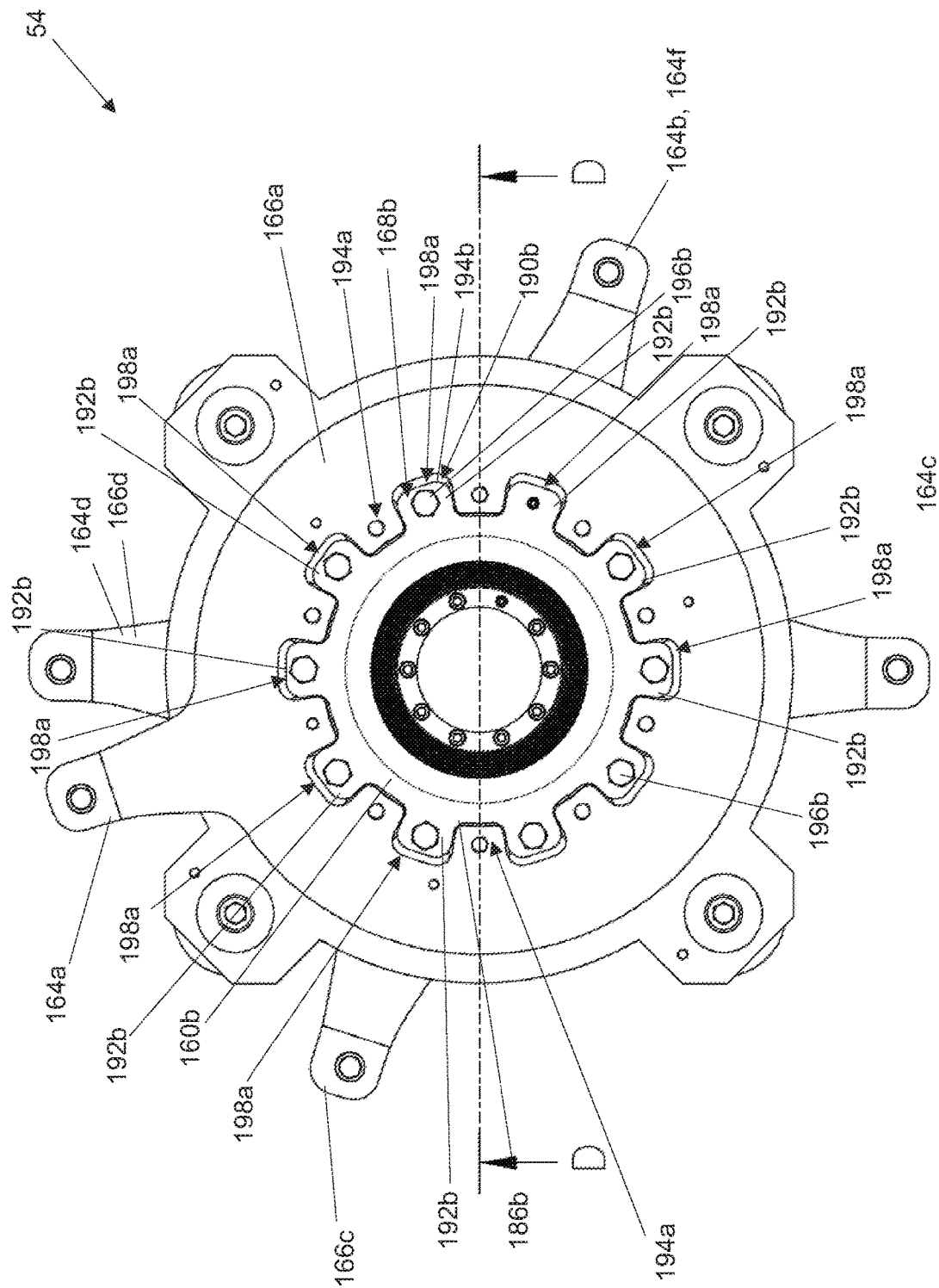
FIG. 33 shows a plan view of the combination of FIG. 32 in the assembly and disassembly position.

This is illustrated in FIGS. 32 and 33 for the first drive element 166a. This first drive element 166a is, in the disassembly position, turned relative to the second drive element 166b, and the second receiving and rotating unit 162b that is still fastened thereto, such that the second connecting bridges 190b align with the first passages 198a; preferably, the centers of the second connecting bridges 190b are aligned with the centers of the first passages 198a. In this position, the screw heads of the second connecting elements 196b are accessible through the first passages 198a, such that the second connecting elements 196b can be removed.

After the removal of the second connecting elements 196b, the second receiving and rotating means 160b can be removed by displacement in an upward axial direction, wherein the second output-side bridge elements 192b can be guided through the first passages 198a between the first drive-side bridge elements 194a of the first drive element 160a. Subsequently, the second drive element 166b is also moved into the disassembly position, wherein the first and the second drive-side bridge elements 194a, 194b align with one another and the third connecting elements 196c are accessible through the first and second passages 198a, 198b. After removal of the third connecting elements, the third receiving and rotating unit 162c can be removed upward in an axial direction, wherein the third output-side bridge elements 192c are guided through the corresponding first and second passages 198a, 198b between the corresponding drive-side bridge elements 194a, 194b of the first and second drive element 166a, 166b. This process can be repeated for the removal of the further receiving and rotating means 160d-160f.

The assembly of the new receiving and rotating means 160f-160a is then performed correspondingly in the reverse sequence, wherein the process is commenced with the sixth receiving and rotating means 160f while the first to fifth drive elements 166a-e are in the disassembly position.

A yet further embodiment of the circumferential wire end shaping device 38 will be discussed below on the basis of FIGS. 34a, 34b, 35 and 36. This embodiment of the circumferential wire end shaping device 38 corresponds substantially to the embodiment of the circumferential wire end shaping device 38 discussed above, and has the same features, such that, in this regard, reference is made to the description above. Additionally, this embodiment of the circumferential wire end shaping device 38 also has at least one radial support means 210 for radially supporting wire ends 34 during the shaping of the wire ends 34 in the circumferential direction.

The mode of operation of such a radial support means 210 will be discussed in more detail in FIGS. 34a and 34b. Here, FIG. 34a shows the housing 18 of the component with a wire end 34 protruding therefrom, which wire end is to be shaped in the circumferential direction by the circumferential wire end shaping device 38 and, for this purpose, has been introduced into one of the receiving and rotating units 162a-162f, wherein, as illustrated in FIG. 34b, the wire end 34 bears against the respective bending formation 102, 104 of the clamping finger 86 of the clamping device 50.

If the shaping, also referred to here as setting, of the wire end 34 in the circumferential direction is now performed, then the wire end 34 has the tendency, indicated by dotted lines in FIG. 34a, to extend rectilinearly over the shortest path, such that the shaping in the radial direction (flaring) that has been performed by the radial wire end shaping device 36 would be subjected to shaping again.

To prevent this, the circumferential bending device 54 has at least one radial support means 210 which radially supports the wire end during the setting, such that the shape in the radial direction, shown by solid lines, is maintained.

Figure 35:
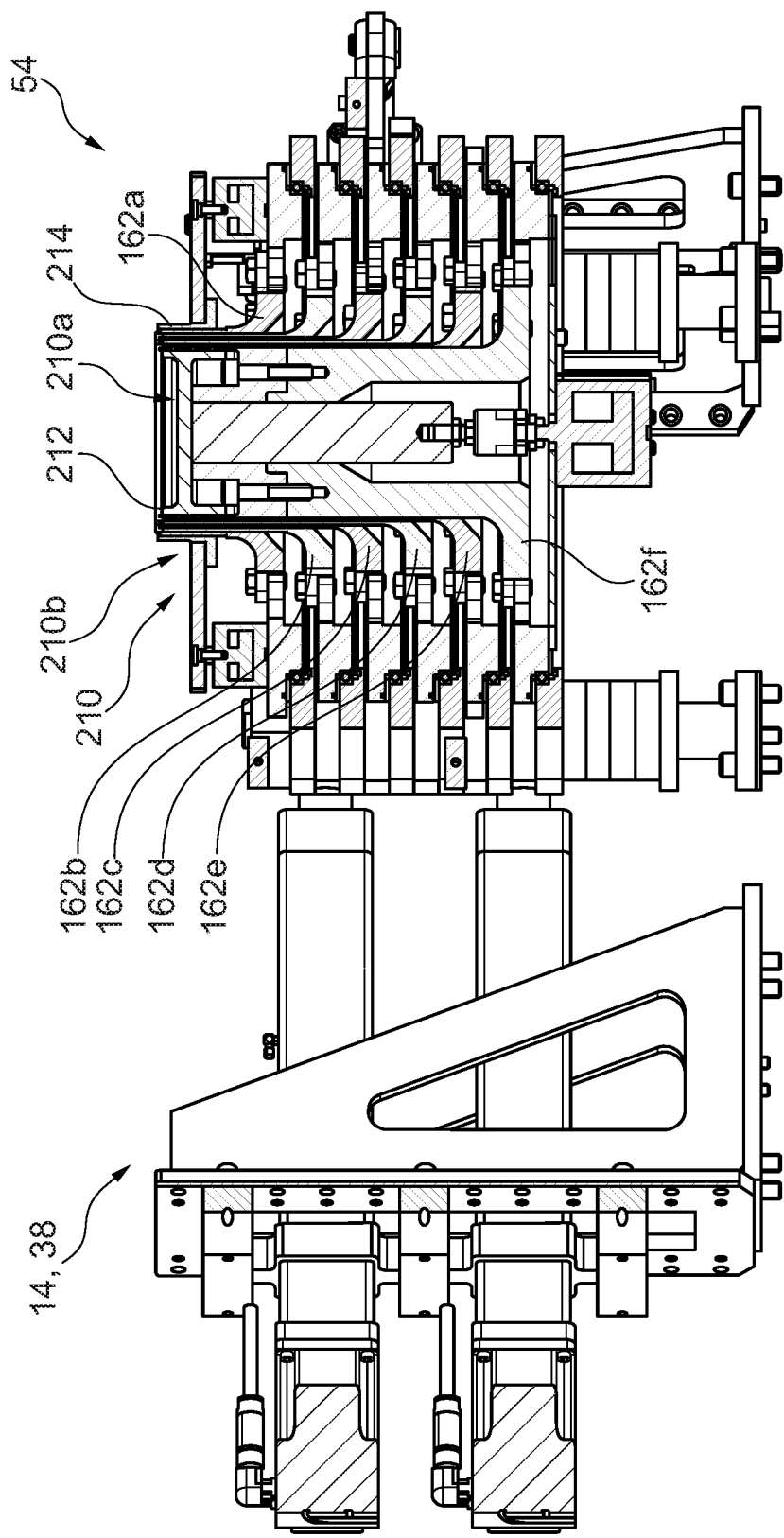
FIG. 35 shows a sectional view through the further embodiment of the circumferential bending device with a first and a second radial support means in a retracted position.

In particular, the embodiment of the circumferential bending device 54 shown in FIGS. 35 and 36 has an inner radial support means 210a, formed as an inner sleeve 212, and an outer radial support means 210b, formed as an outer sleeve 214. The radial support means 210, 210a, 210b are axially movable between a retracted position illustrated in FIG. 35 and a supporting position illustrated in FIG. 36.

The sleeves 212, 214 are formed as annular sleeves with a circular circumference and an axis of symmetry which coincides with the axis of rotation of the receiving and rotating units 162a-162f. The sleeves 212, 214 are movable between the retracted position and the supporting position, for example hydraulically or pneumatically, and in a manner controlled by the second controller 70. The movement from the retracted position into the supporting position is performed with a predetermined maximum pressure, for example of 3 to 4 bar, such that the movement is stopped when the maximum pressure is reached in the event of impacting against an abutment or against an obstruction. As a result, at least the inner sleeve 212 is of flexible design.

The outer radial support means 210b formed as an outer sleeve 214 lies, in the supporting position, radially at the outside against wire ends 34, 34a, such that outward bulging of the wire ends 34, 34b is prevented.

The radial support means 210, 210a, 210b are controlled such that, firstly, the retracted position illustrated in FIG. 35 is set when the wire ends are moved into the receiving holes 176. The supporting position of the radial support means 210, 210a, 210b shown in FIG. 36 is thereupon assumed before the rotational movement of the receiving and rotating units 162a-162f begins. The rotational movement and thus the shaping of the wire ends 34 in the circumferential direction is performed with the radial support means 210, 210a, 210b having been moved in this supporting position. Here, the control pressure on the inner sleeve 212 is reduced, such that the inner sleeve can move conjointly, correspondingly to the desired axial movement of the wire ends 34, during the shaping.

Subsequently, the radial support means 210, 210a, 210b are in turn moved into the retracted position shown in FIG. 35, and the preloading and/or fixing device 40 can be engaged for the purposes of preloading and/or fixing the wire ends 34. The component is then, together with this preloading and/or fixing device 40, moved out of the engagement with the circumferential bending device 54, by virtue of the wire ends 34 being pulled out of the receiving holes 176. The component is then transported onward to the next processing step of the component production device 10.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE DESIGNATIONS

10 Component production device
12 Hairpin
14 Wire end shaping device
16 Housing production device
18 Housing
20 Housing groove
22 Device for producing groove insulators
24 Groove insulator
26 Hairpin production device
28 Pre-positioning device
30 Hairpin insertion device
32 Winding head
34 Wire end
34a First wire end
34b Second wire end
34c Third wire end
34d Fourth wire end
36 Radial wire end shaping device
38 Circumferential wire end shaping device
40 Preloading and/or fixing device
42 Wire end cutting device
44 Wire end welding device
46 Devices for electrical contacting and/or testing and/or potting, . . . .
48a First wire segment
48b Second wire segment
48c Third wire segment
48d Fourth wire segment
50 Clamping device
52 Radial bending device
54 Circumferential bending device
56 First relative movement device
58 Second relative movement device
60 Transport device
62 Control device
64 Housing holder
66 Housing holder drive
68 First controller
70 Second controller
72 Third controller
74 First clamping means (inner clamping means)
76 Second clamping means (outer clamping means)
78 Inner wall region
80 Annular disk body
82 Annular flange
84 Cutout
85 Tip receptacle
86 Clamping finger
87 Holding ring
88 Toothed-gear shaft
90 Rod element
92 Slot
94 Fastening screw
96 Tip
98 Step
100 First rounded bending formation (flaring)
102 Second rounded bending formation (setting)
104 Third rounded bending formation (setting)
106 Receiving groove of the clamping device
108 First clamping region
110 Second clamping region
112 Radially movable segment
114 Main body of the clamping device
116 Annular disk
118 Drive thread
120 Conical drive element
122 Annular depression
124 Base plate
126 Base plate drive means
128 Drive plate
130 Drive plate drive means
132 Gripper
134 Gripper unit
136 Displacement rail
138 Gripper carriage
140 First gripping jaw
142 Second gripping jaw
144 Guide block
146 First guide groove
148 Second guide groove
150 Slotted-guide pin
152 Slotted guide
154 Free end of a gripping jaw
156 Projection on the free end of the gripping jaw
158 Clamping surface
160a First receiving and rotating means
160b Second receiving and rotating means
160c Third receiving and rotating means
160d Fourth receiving and rotating means
160e Fifth receiving and rotating means
160f Sixth receiving and rotating means
162a First receiving and rotating unit
162b Second receiving and rotating unit
162c Third receiving and rotating unit
162d Fourth receiving and rotating unit
162e Fifth receiving and rotating unit
162f Sixth receiving and rotating unit
164a First drive means
164b Second drive means
164c Third drive means
164d Fourth drive means
164e Fifth drive means
164f Sixth drive means
166a First drive element
166b Second drive element
166c Third drive element
166d Fourth drive element
166e Fifth drive element
166f Sixth drive element
168a First actuator
168b Second actuator
168c Third actuator
168d Fourth actuator
168e Fifth actuator
168f Sixth actuator
170a First annular support disk
170b Second annular support disk
170c Third annular support disk
170d Fourth annular support disk
170e Fifth annular support disk
170f Sixth annular support disk 172 Machine frame
174 Fastening column
176 Receiving holes
180a First setting crown
180b Second setting crown
180c Third setting crown
180d Fourth setting crown
180e Fifth setting crown
180f Sixth setting crown
182 Wire end receptacle
184a First cylinder-shell-shaped region
184b Second cylinder-shell-shaped region
184c Third cylinder-shell-shaped region
184d Fourth cylinder-shell-shaped region
184e Fifth cylinder-shell-shaped region
184f Sixth cylinder-shell-shaped region
186a First annular flange
186b Second annular flange
186c Third annular flange
186d Fourth annular flange
186e Fifth annular flange
186f Sixth annular flange
188a First releasable connection
188b Second releasable connection
188c Third releasable connection
188d Fourth releasable connection
188e Fifth releasable connection
188f Sixth releasable connection
190a First connecting bridge
190b Second connecting bridge
190c Third connecting bridge
190d Fourth connecting bridge
190e Fifth connecting bridge
190f Sixth connecting bridge
192a First output-side bridge element
192b Second output-side bridge element
192c Third output-side bridge element
192d Fourth output-side bridge element
192e Fifth output-side bridge element
192f Sixth output-side bridge element
194a First drive-side bridge element
194b Second drive-side bridge element
194c Third drive-side bridge element
194d Fourth drive-side bridge element
194e Fifth drive-side bridge element
194f Sixth drive-side bridge element
196a First connecting element
196b Second connecting element
196c Third connecting element
196d Fourth connecting element
196e Fifth connecting element
196f Sixth connecting element
198a First passage
198b Second passage
198c Third passage
198d Fourth passage
198e Fifth passage
198f Sixth passage
200 Longitudinal groove
202 Insertion bevel
204 Setting crown ring
210 Radial support means
210a Inner radial support means
210b Outer radial support means
212 Inner sleeve
214 Outer sleeve

The invention claimed is:

1. A wire end shaping method for shaping wire ends during a course of production of a component of an electric machine, wherein the wire ends protrude from an annular housing, wherein the component is equipped with coils, the method comprising:
   a) providing or using a bending device which has a first receiving and rotating unit, rotatable about an axis of rotation, for receiving first wire ends and which has a second receiving and rotating unit, rotatable about an axis of rotation, for receiving second wire ends which are radially offset with respect to the first wire ends, wherein the receiving and rotating units are rotatable relative to one another but are static or held relative to one another in an axial direction,
   b) moving the housing and the bending device in an axial relative movement in order to introduce the first wire ends into the first receiving and rotating unit and the second wire ends into the second receiving and rotating unit and in order to compensate an axial change in length of wire ends during a bending operation,
   c) rotating the first receiving and rotating unit relative to the housing to bend the first wire ends after end regions of the first wire ends have been introduced into the first receiving and rotating unit, and rotating the second receiving and rotating unit relative to the housing to bend the second wire ends after end regions of the second wire ends have been introduced into the second receiving and rotating unit,
   wherein the rotation of the first and second receiving and rotating units is performed with different movement profiles in a manner dependent on the axial relative movement and on an axial length of the received wire ends such that further axial relative movement between the end regions of the wire ends and the respective receiving and rotating unit is prevented.

2. The wire end shaping method as claimed in claim 1, wherein at least one of:
   the axial relative movement in step b) is performed with a uniform speed and the rotation in step c) is performed in each case with a varying rotational speed;
   in step a), the bending device with a third receiving and rotating unit for receiving third wire ends, which are radially offset relative to the first and second wire ends, and for turning the third wire ends for bending in the circumferential direction is provided or used, wherein the third receiving and rotating unit is rotatable relative to the first and second receiving and rotating unit about the axis of rotation but is axially static or held and, in step c), after the introduction of end regions of the third wire ends, is rotated such that a relative movement of the end regions in the third receiving and rotating unit is prevented; or
   in step a), the bending device with a fourth receiving and rotating unit for receiving fourth wire ends, which are radially offset relative to the first to third wire ends, and for turning the fourth wire ends for bending in the circumferential direction is provided or used, wherein the fourth receiving and rotating unit is rotatable relative to the first to third receiving and rotating unit about the axis of rotation but is axially static or held and, in step c), after the introduction of end regions of the fourth wire ends, is rotated such that a relative movement of the end regions in the fourth receiving and rotating unit is prevented.

3. The wire end shaping method as claimed in claim 2, wherein at least one of:
rotational movements of individual receiving and rotating units are correspondingly, in a case of different lengths of the wire ends to be bent in each case, started at correspondingly different points in time, or
the rotational movements of all receiving and rotating units and a relative movement between housing and bending device are ended at the same time.

4. The wire end shaping method as claimed in claim 1, wherein the wire ends are fixedly clamped by means of a clamping device arranged between the housing and the bending device, during a bending process.

5. The wire end shaping method as claimed in claim 4, further comprising at least one of the following steps:
fixing a first clamping means to the housing or in a positionally static manner, and moving a second clamping means relative to the first clamping means to clamp the wire ends between the first and the second clamping means;
jointly clamping all wire ends which protrude out of a groove of a housing;
supporting a first of multiple clamping means, which are movable relative to one another, against inner wall regions of the housing, which inner wall regions are arranged between grooves of the housing;
radially moving multiple segments of a first of multiple clamping means, which are movable relative to one another, to at least one of fix the first clamping means to the housing or for release from the housing;
driving, by means of an axially movable drive element, a radial movement of multiple segments of a first of multiple clamping means, which are movable relative to one another, in order to at least one of fix the first clamping means to the housing or for release from the housing, and jointly transmitting the axial movement to the segments by means of a control surface or a conical surface;
abutting a first clamping region, which is formed on a first of multiple clamping means, which are movable relative to one another, against radially inner sides of wire ends, arranged radially at the inside, of the wire ends protruding out of the grooves of the housing;
radially moving a number of clamping fingers, provided correspondingly to a number of at least one of groups of wire ends to be clamped together or of grooves in the housing, to clamp the wire ends or for releasing the clamping;
clamping, in each case, one group of the wire ends between a first clamping means and, in each case, one radially movable clamping finger of a second clamping means;
supporting clamping fingers, which are moving into a clamping position, against displacement in a circumferential direction or in an axial direction;
clamping fingers, which are moving into a clamping position, against displacement in a circumferential direction or in an axial direction by means of positively locking engagement of each clamping finger into one or on a complementary grasping unit;
supporting clamping fingers, which are moving into the clamping position, against displacement in a circumferential direction or in an axial direction by means of positively locking engagement of a tip of each clamping finger of a second clamping means into a corresponding tip receptacle on the first clamping means;
deforming the wire ends by abutment against bending formations or bending edges arranged on the clamping device;
at least one of jointly or synchronously driving a radial movement of clamping fingers to clamp the wire ends;
jointly guiding the radial movement of the clamping fingers on a holding ring; or
receiving the two, three, four, five, six or more wire ends, which are to be clamped and which jointly emerge from a groove of the housing, in a receiving groove which is formed by adjacent clamping fingers at free ends thereof, wherein the receiving groove is delimited, at one side running substantially in a radial direction and at one side running substantially in a circumferential direction, by one clamping finger, and at another side running substantially in a radial direction, by another clamping finger, and is open at another side running substantially in a circumferential direction.

6. The wire end shaping method as claimed in claim 1, further comprising the following step:
radially bending one or more wire ends, which jointly protrude from a groove of the housing, to flare said wire ends prior to an introduction into the bending device.

7. The wire end shaping method as claimed in claim 1, wherein step c) comprises:
c1) radially supporting at least some of the wire ends on at least one of a radially inner side or a radially outer side during a bending process.

8. The wire end shaping method as claimed in claim 7, wherein step c1) comprises:
axially moving at least one radial support means out from a retracted position into a supporting position before the bending process and axially moving the at least one radial support means in from the supporting position into a retracted position after the bending process.

* * * * *